(12) United States Patent
Woodsum

(10) Patent No.: US 10,305,717 B2
(45) Date of Patent: May 28, 2019

(54) DEVICES AND METHODS USING THE HERMETIC TRANSFORM FOR TRANSMITTING AND RECEIVING SIGNALS USING MULTI-CHANNEL SIGNALING

(71) Applicant: VertoCOMM, Inc., Weston, MA (US)

(72) Inventor: Harvey C. Woodsum, Bedford, NH (US)

(73) Assignee: VertoCOMM, Inc., Weston, MA (US)

( * ) Notice: Subject to any disclaimer, the term of this patent is extended or adjusted under 35 U.S.C. 154(b) by 0 days.

(21) Appl. No.: 15/443,109

(22) Filed: Feb. 27, 2017

(65) Prior Publication Data

US 2017/0250744 A1    Aug. 31, 2017

Related U.S. Application Data

(60) Provisional application No. 62/300,482, filed on Feb. 26, 2016.

(51) Int. Cl.
*H04L 27/26* (2006.01)
*H04L 27/36* (2006.01)
*H04L 25/03* (2006.01)

(52) U.S. Cl.
CPC .... *H04L 27/2663* (2013.01); *H04L 25/03012* (2013.01); *H04L 27/2639* (2013.01); *H04L 27/2649* (2013.01); *H04L 27/2656* (2013.01); *H04L 27/367* (2013.01)

(58) Field of Classification Search
CPC ... H04B 1/707; H04B 7/0639; H04L 27/2601; H04L 27/2657; H04L 27/2662; H04L 27/2663; H04L 27/2675; H04L 7/041
See application file for complete search history.

(56) References Cited

U.S. PATENT DOCUMENTS

| 4,338,605 A | 7/1982 | Mims |
| 4,989,090 A | 1/1991 | Campbell et al. |
| 5,479,176 A | 12/1995 | Zavrel, Jr. |
| 5,583,884 A | 12/1996 | Maruyama et al. |

(Continued)

FOREIGN PATENT DOCUMENTS

WO    WO 2013/134506    9/2013

OTHER PUBLICATIONS

Doblinger, G., "Beamforming with Optimized Interpolated Microphone Arrays," IEEE HSCMA Conference Proceedings, pp. 33-36 (2008).

(Continued)

*Primary Examiner* — Khanh C Tran
(74) *Attorney, Agent, or Firm* — Wilmer Cutler Pickering Hale and Dorr LLP

(57) ABSTRACT

According to an exemplary embodiment, a method of making a Hermetic transform to mitigate noise comprises: receiving over a channel signal frames comprising predetermined data and gaps comprising noise; framing the predetermined data; constructing a set of linear equations which relate a transfer function matrix of the channel to the predetermined data; determining the transfer function matrix by inverting the linear equations using a first pseudo inverse matrix; incorporating transfer function matrix into linear equations for a hermetic transform; and determining the hermetic transform using a second pseudo inverse matrix based on the predetermined data and the noise.

16 Claims, 35 Drawing Sheets

(56) References Cited

U.S. PATENT DOCUMENTS

| | | | |
|---|---|---|---|
| 5,640,423 A | 6/1997 | Archer | |
| 5,892,847 A | 4/1999 | Johnson | |
| 5,933,537 A | 8/1999 | Hajjahmad et al. | |
| 6,101,399 A | 8/2000 | Raleigh et al. | |
| 6,185,440 B1 | 2/2001 | Barratt et al. | |
| 6,229,486 B1 | 5/2001 | Krile | |
| 6,317,612 B1 | 11/2001 | Farsakh | |
| 6,408,109 B1 | 6/2002 | Silver et al. | |
| 6,421,007 B1 | 7/2002 | Owen et al. | |
| 6,427,531 B1 | 8/2002 | Chintawongvanich | |
| 6,876,693 B2 | 4/2005 | Sim | |
| 6,943,732 B2 | 9/2005 | Gottl et al. | |
| 6,947,470 B2 | 9/2005 | Berens | |
| 7,012,978 B2 | 3/2006 | Talwar | |
| 7,065,070 B1 | 6/2006 | Chang | |
| 7,092,690 B2 | 8/2006 | Zancewicz | |
| 7,103,537 B2 | 9/2006 | Witzgall et al. | |
| 7,106,785 B2 | 9/2006 | Yoshida | |
| 7,260,370 B2 | 8/2007 | Wang et al. | |
| 7,280,627 B2 | 10/2007 | Orlin | |
| 7,298,805 B2 | 11/2007 | Walton et al. | |
| 7,415,711 B2 | 8/2008 | Chew et al. | |
| 7,443,942 B2 | 10/2008 | Kouyama | |
| 7,450,067 B2 | 11/2008 | Xin | |
| 7,873,016 B2 | 1/2011 | Kim | |
| 7,925,234 B2 | 4/2011 | Yeh et al. | |
| 8,005,162 B2 | 8/2011 | Cai et al. | |
| 8,036,287 B2 | 10/2011 | Hwang et al. | |
| 8,064,408 B2 | 11/2011 | Woodsum | |
| 8,363,704 B1 | 1/2013 | Rayburn | |
| 8,433,804 B2 | 4/2013 | Swanburg et al. | |
| 8,917,786 B1 | 12/2014 | von der Embse | |
| 9,154,353 B2 | 10/2015 | Woodsum | |
| 9,425,876 B2 * | 8/2016 | Yu | H04B 7/0478 |
| 2002/0034215 A1 | 3/2002 | Inoue et al. | |
| 2003/0039303 A1 | 2/2003 | Sriram | |
| 2003/0216156 A1 | 11/2003 | Chun | |
| 2004/0071200 A1 | 4/2004 | Betz et al. | |
| 2004/0095990 A1 | 5/2004 | Gossett et al. | |
| 2004/0120429 A1 | 6/2004 | Orlin | |
| 2005/0101253 A1 | 5/2005 | Pajukoski et al. | |
| 2005/0128937 A1 | 6/2005 | Akopian | |
| 2005/0141545 A1 | 6/2005 | Fein et al. | |
| 2005/0200515 A1 | 9/2005 | Cherniakov | |
| 2005/0271016 A1 | 12/2005 | Kim et al. | |
| 2006/0013332 A1 | 1/2006 | Rayburn | |
| 2006/0030364 A1 | 2/2006 | Olesen et al. | |
| 2006/0053005 A1 | 3/2006 | Gulati | |
| 2006/0062324 A1 | 3/2006 | Naito et al. | |
| 2006/0244660 A1 | 11/2006 | Ann et al. | |
| 2007/0001897 A1 | 1/2007 | Alland | |
| 2007/0164902 A1 | 7/2007 | Bang et al. | |
| 2007/0189362 A1 | 8/2007 | D'Amico et al. | |
| 2007/0213013 A1 | 9/2007 | Kim | |
| 2008/0129584 A1 | 6/2008 | Antonik et al. | |
| 2008/0260066 A1 | 10/2008 | Cai et al. | |
| 2008/0317172 A1 | 12/2008 | Zhang et al. | |
| 2009/0135957 A1 | 5/2009 | Norris et al. | |
| 2009/0213969 A1 * | 8/2009 | Hasegawa | H04L 25/03012 375/343 |
| 2009/0237294 A1 | 9/2009 | Shoji et al. | |
| 2009/0239551 A1 | 9/2009 | Woodsum | |
| 2010/0178057 A1 | 7/2010 | Shieh | |
| 2010/0254325 A1 | 10/2010 | Narasimhan et al. | |
| 2010/0272005 A1 | 10/2010 | Larsson et al. | |
| 2010/0303182 A1 | 12/2010 | Daneshrad et al. | |
| 2011/0013505 A1 * | 1/2011 | Dyson | H04J 13/12 370/208 |
| 2011/0187702 A1 | 8/2011 | Schwartz | |
| 2011/0188597 A1 | 8/2011 | Agee et al. | |
| 2011/0288823 A1 | 11/2011 | Gupta | |
| 2012/0027111 A1 | 2/2012 | Vook et al. | |
| 2012/0064916 A1 | 3/2012 | Woodsum | |
| 2012/0188058 A1 | 7/2012 | Lee et al. | |
| 2012/0212371 A1 | 8/2012 | Chang | |
| 2012/0213115 A1 * | 8/2012 | Shi | H04L 25/0244 370/252 |
| 2012/0262328 A1 | 10/2012 | Shinonaga et al. | |
| 2013/0116561 A1 | 5/2013 | Rothberg et al. | |
| 2013/0188730 A1 * | 7/2013 | Hong | H04N 19/625 375/240.18 |
| 2013/0195177 A1 * | 8/2013 | Hong | H04N 19/625 375/240.2 |
| 2013/0252568 A1 | 9/2013 | Woodsum | |
| 2013/0344909 A1 | 12/2013 | Davydov et al. | |
| 2014/0044208 A1 | 2/2014 | Woodsum | |
| 2014/0301450 A1 * | 10/2014 | Alshina | H04N 19/00078 375/240.03 |
| 2015/0117537 A1 | 4/2015 | Luo et al. | |
| 2015/0145716 A1 | 5/2015 | Woodsum | |
| 2016/0019900 A1 * | 1/2016 | Vasilache | G10L 19/038 381/23 |
| 2016/0028571 A1 | 1/2016 | Woodsum | |

OTHER PUBLICATIONS

Gabel and Roberts, Signals and Linear Systems, 2nd Edition, John Wiley & Sons, New York, pp. 327-332, 345 (1980) (9 total pgs.).
Goshi, et al., "A Compact Digital Beamforming SMILE Array for Mobile Communications," IEEE Transations on Microwave Theory and Techniques, vol. 52, No. 12, 7 pgs. (Dec. 2004).
Koch et al., "Increased Capacity per Unit-Cost by Oversampling", Arxiv., Org., Cornell University Library, 201 OLIN Library, Aug. 31, 2010, pp. 1-27 (2010).
Monzingo and Miller, Introduction to Adaptive Arrays, John Wiley & Sons, pp. 217-292 (78 pages) (1980).
Pinchon et al., "A Design Technique for Oversampled Modulated Filter Banks and OFDM/QAM Modulations" In: "Lecture Notes in Computer Science", vol. 3124, pp. 578-588 (2004) (10 pages).
Rao, C.R., "Estimation of Variance and Covariance Quantities in Linear Models," J. Stat. Assoc., Issue 337, pp. 112-115 (Mar. 1972) (Published online Apr. 5, 2012).
Woodsum and Woodsum, "Optimization of Cascaded Hermetic Transform Processing Architectures via a Chimerical Hybrid Genetic Algorithm," Proceedings of the Sixteenth International Conference on Cognitive and Neural Systems (ICCNS), Boston University, May 30-Jun. 1, 2012 (1 page).
Zhang et al., "An oversampled filter bank multicarrier system for Cognitive Radio," IEEE 19th International Symposium on Personal, Indoor and Mobile Radio Communications, (PIMRC 2008) Sep. 15, 2008, (5 pages).
Office Action dated Apr. 2, 2019 received in related U.S. Appl. No. 16/256,624 filed Jan. 24, 2019 (11 pages).

* cited by examiner

DEVICES AND METHODS USING THE HERMETIC TRANSFORM FOR TRANSMITTING AND RECEIVING SIGNALS USING MULTI-CHANNEL SIGNALING

RELATED APPLICATIONS

This application claims the benefit of U.S. Provisional Patent Application No. 62/300,482, filed Feb. 26, 2016, which is hereby incorporated by reference in its entirety.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

This technology relates generally to apparatuses and methods for communications and more particularly to devices and methods using the Hermetic Transform for transmitting and receiving signals using multi-channel signaling.

BACKGROUND

Modern digital communications make use of a variety of signal processing techniques in order to accomplish high channel capacity transmission and reception of digital forms of information. The efficiency of spectrum utilization, known as spectral efficiency (measured in bits/sec per Hz of spectrum) is one measure of the utility of any specific means of communications. Therefore, it is desirable to provide systems and methods with improved spectral efficiency and other properties.

SUMMARY

According to an exemplary embodiment, a method of making a Hermetic transform to mitigate noise comprises receiving over a channel signal frames comprising predetermined data and gaps comprising noise; framing the predetermined data; constructing a set of linear equations which relate a transfer function matrix of the channel to the predetermined data; determining the transfer function matrix by inverting the linear equations using a first pseudo inverse matrix; incorporating transfer function matrix into linear equations for a hermetic transform; and determining the hermetic transform using a second pseudo inverse matrix based on the predetermined data and the noise.

According to an exemplary embodiment, an apparatus for making a Hermetic transform to mitigate noise comprises a receiver for receiving over a channel signal frames comprising predetermined data and gaps comprising noise; and a processor configured to: frame the predetermined data; construct a set of linear equations which relate a transfer function matrix of the channel to the received data; determine the transfer function matrix by inverting the linear equations using a first pseudo inverse matrix; incorporate transfer function matrix into linear equations for a hermetic transform; and determine the hermetic transform using a second pseudo inverse matrix.

According to an exemplary embodiment, a method of distributing signal modulation comprises applying a pre-distortion matrix to a complex modulation vector to produce a pre-distorted modulation vector; applying an orthogonal matrix to the pre-distorted modulation vector to distribute the pre-distorted modulation vector over a set of channel signal basis functions of a channel signal matrix to produce a distributed modulation vector; applying the channel signal matrix to the distributed modulation vector to produce a signal frame; and transmitting the signal frame.

According to an exemplary embodiment, an apparatus for distributing signal modulation comprises a processor configured to: apply a pre-distortion matrix to complex a modulation vector to produce a pre-distorted modulation vector; apply an orthogonal matrix to the pre-distorted modulation vector to distribute the pre-distorted modulation vector over a set of channel signal basis functions of a channel signal matrix to produce a distributed modulation vector; apply the channel signal matrix to the distributed modulation vector to produce a signal frame; and a transmitter for transmitting the signal frame.

According to an exemplary embodiment, a method receiving distributed signal modulation comprises receiving over a channel data comprising signal frames; determining a signal domain hermetic transform using a pseudo inverse matrix; applying the signal domain hermetic transform to the signal frames to produce an intermediate vector result; and applying a code domain transform to the intermediate vector result to remove modulation distribution and recover an original transmitted modulation vector.

According to an exemplary embodiment, an apparatus for receiving distributed signal modulation comprises a receiver for receiving over a channel data comprising signal frames; a processor configured to: determine a signal domain hermetic transform using a pseudo inverse matrix; apply the signal domain hermetic transform to the signal frames to produce an intermediate vector result; and apply a code domain transform to the intermediate vector result to remove modulation distribution and recover an original transmitted modulation vector.

According to an exemplary embodiment, a method of parallel discrete hermetic transform demodulation comprises receiving over a channel data comprising signal frames; determining a plurality of hermetic transforms corresponding to a plurality of channel conditions and noise conditions; applying the plurality of hermetic transforms to the signal frames to produce a plurality of intermediate modulation vector results; and producing final modulation vector results corresponding to the signal frames by at least one of selecting or combining the intermediate modulation vector results.

In some embodiments, the method further comprises determining a set of weights to be applied to the intermediate modulation vector results, wherein the weights are selected to minimize a total square distance between the final modulation vector results and a constellation; applying the weights to each of the intermediate modulation vector results to produce weighted intermediate modulation vector results; and summing the weighted intermediate modulation vector results to produce the final modulation vector results.

In some embodiments, the method further comprises selecting the intermediate modulation vector results which minimize a total square distance between the final modulation vector results and a constellation.

According to an exemplary embodiment, an apparatus for parallel discrete hermetic transform demodulation comprises a receiver for receiving over a channel data comprising signal frames; a processor configured to: determine a plurality of hermetic transforms corresponding to a plurality of channel conditions and noise conditions; determine a plurality of hermetic transforms corresponding to a plurality of channel conditions and noise conditions; and produce final modulation vector results corresponding to the signal frames by at least one of selecting or combining the intermediate modulation vector results.

In some embodiments, the processor is further configured to: determine a set of weights to be applied to the intermediate modulation vector results, wherein the weights are selected to minimize a total square distance between the final modulation vector results and a constellation; apply the weights to each of the intermediate modulation vector results to produce weighted intermediate modulation vector results; and sum the weighted intermediate modulation vector results to produce the final modulation vector results.

In some embodiments, the processor is further configured to: select the intermediate modulation vector results which minimize a total square distance between the final modulation vector results and a constellation.

According to an exemplary embodiment, a method for signal framing comprises receiving over a channel synchronization frames; determining a plurality of hermetic matched filters corresponding to a plurality of channel conditions and noise conditions for the synchronization frames; applying the plurality of hermetic matched filters to the synchronization frames to produce a plurality of synchronization frame correlation results; and producing final synchronization frame correlation results corresponding to the synchronization frames by at least one of selecting or combining the plurality of synchronization frame correlation results.

In some embodiments, the method further comprises determining a set of peaks corresponding to the plurality of synchronization frame correlation results; determining a set of synchronization frame locations for each of the synchronization frames corresponding to each of the peaks of the synchronization frame correlation results; applying a hermetic transform to each of the synchronization frame locations to produce demodulation results for each frame; and producing final synchronization frame correlation results by selecting synchronization frame locations that minimize a total square distance between the demodulation results and a constellation.

According to an exemplary embodiment, an apparatus for signal framing comprises a receiver for receiving over a channel synchronization frames; and a processor configured to: determine a plurality of hermetic matched filters corresponding to a plurality of channel conditions and noise conditions for the synchronization frames; apply the plurality of hermetic matched filters to the synchronization frames to produce a plurality of synchronization frame correlation results; and produce final synchronization frame correlation results corresponding to the synchronization frames by at least one of selecting or combining the plurality of synchronization frame correlation results.

In some embodiments, the apparatus is further configured to: determine a set of peaks corresponding to the plurality of synchronization frame correlation results; determine a set of synchronization frame locations for each of the synchronization frames corresponding to each of the peaks of the synchronization frame correlation results; apply a hermetic transform to each of the synchronization frame locations to produce demodulation results for each frame; and produce final synchronization frame correlation results by selecting synchronization frame locations that minimize a total square distance between the demodulation results and a constellation.

According to an exemplary embodiment, a method for spectral compacting comprises generating a set of orthogonal basis signals; modulating each of the basis signals with a complex modulation based on a constellation of complex symbols to produce modulated basis signals; summing the modulated basis signals to produce a frame of signal data; applying a matrix transformation to the frame of signal data to produce a reduced bandwidth frame of signal data; and transmitting the reduced bandwidth frame of signal data.

According to an exemplary embodiment, an apparatus for spectral compacting comprises a processor configured to: generate a set of orthogonal basis signals; modulate each of the basis signals with a complex modulation based on a constellation of complex symbols to produce modulated basis signals; sum the modulated basis signals to produce a frame of signal data; and apply a matrix transformation to the frame of signal data to produce a reduced bandwidth frame of signal data; and a transmitter configured to transmit the reduced bandwidth frame of signal data.

According to an exemplary embodiment, a method for spectral de-compacting comprises receiving a frame of signal data; applying an inverse transformation of matrix transformation to the frame of signal data to produce de-compacted frame of signal data; and applying a transformation to the de-compacted frame of signal data to extract complex symbols.

According to an exemplary embodiment, an apparatus for spectral de-compacting, the apparatus comprising a receiver configured to receive a frame of signal data; and a processor configured to: apply an inverse transformation of matrix transformation to the frame of signal data to produce de-compacted frame of signal data; and apply a transformation to the de-compacted frame of signal data to extract complex symbols.

These and other aspects and embodiments of the disclosure are illustrated and described below.

BRIEF DESCRIPTION OF THE DRAWINGS

The disclosed embodiments are described with reference to the following figures, which are presented for the purpose of illustration only and are not intended to be limiting.

In the Drawings.

DETAILED DESCRIPTION

Figure 1:
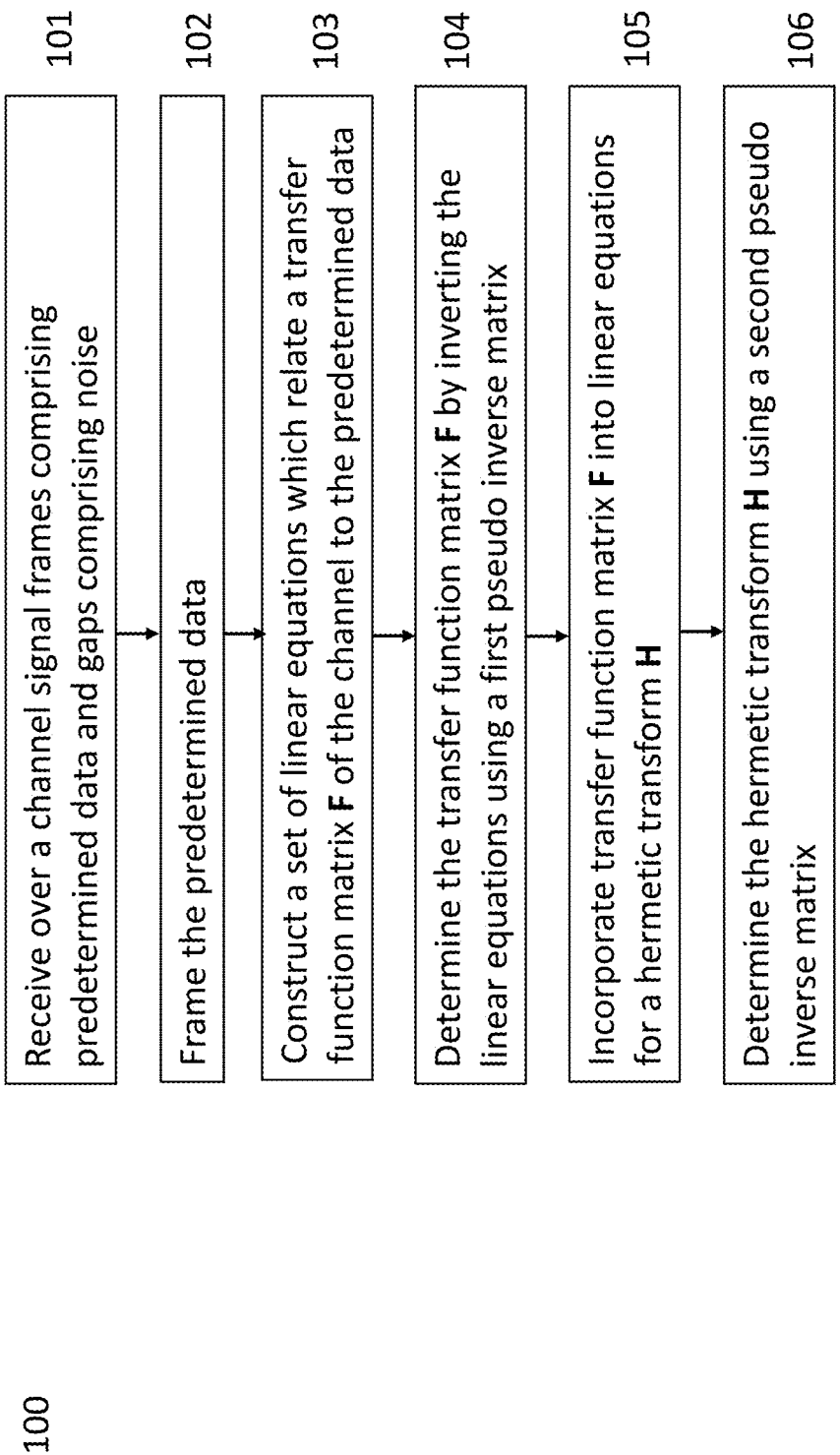
FIG. 1 shows a method of making a Hermetic transform to mitigate noise according to an exemplary embodiment.

In some embodiments, the present disclosure presents alternate embodiments of HOFDM, pertaining both to alternate methods of creating Hermetic Transform demodulators and to enhancement of various aspects of communications systems employing Hermetic Transforms. For example, several of the embodiments presented provide beneficial enhancement and increase of robustness of communications in the presence of various channel impairments, such as additive noise, propagation effects, and filtering during transmission and reception. Several of the embodiments make use of calibration procedures, wherein the transform is effectively derived from the channel basis signals as received rather than from the channel basis signals in their pure mathematical form, prior to transmission. Hermetic Transforms are further described in U.S. patent applications Ser. No. 13/958,416, "Devices and methods using the hermetic transform for transmitting and receiving signals using OFDM" and Ser. No. 14/875,600, "Devices and methods using the hermetic transform for transmitting and receiving signals using OFDM," which are incorporated by reference herein in their entirety.

One specific method of multi-channel signaling known as Orthogonal Frequency Division Multiplexing (OFDM) has high spectral efficiency. Some OFDM systems generate a sequence of frames of data to create a digital signal that is nominally converted to analog form and transmitted over wireless radio frequency, or analog modem. In the creation of each frame of data, an Inverse Fast Fourier Transform (IFFT) operation, or equivalently an Inverse Discrete Fourier Transform (IDFT) operation is utilized to create a set of (N) orthogonal sinusoidal type signals which are individually modulated to send information. The sinusoidal signals are created as in-phase and quadrature (I&Q) channels, or equivalently as complex data, and modulated via multiplication of each channel signal by complex numbers drawn from a constellation of complex values. Each complex value in the constellation represents a digital symbol comprising M bits, e.g. a constellation of 64 complex symbols can transmit log2(64)=6 bits per symbol. The use of N multiple channels combined with M bits per symbol per channel allows transmission of NM bits per frame of data. Frames are concatenated for form a signal stream.

Each OFDM signal frame comprises a set of independent Quadrature-Amplitude Modulated (QAM) signals transmitted with sub-carriers that are arranged at orthogonal frequency spacings. The OFDM channel signals for a given frame are combined by summing. The frame signals are then concatenated in order to make a signal stream that is converted to analog form, converting either directly RF via quadrature digital to analog conversion or to baseband with subsequent frequency translation to RF.

On the receiving end, the RF signal is either mixed down to baseband, or directly converted via quadrature analog to digital conversion. Synchronization of frames is accomplished, typically using matched filtering or correlation to synchronization frames embedded in the signal stream, in order to produce a set of data vectors from each frame. A Fast Fourier Transform (FFT) operation, or equivalently, a Discrete Fourier Transform (DFT) operation, is applied data to each of the frame data vectors in order to recover the N complex symbol values, which are then matched to the sending symbol constellation in order to recover the M bits per symbol value that have been encoded on the sending end. Typically, a Gray Code is utilized encode symbols as bit patterns, so that adjacent symbol locations in the complex (I&Q) space differ only by one bit so that bit error rate (BER) is minimized. In terms of hardware embodiments, the digital signal processing required for the steps outlined above may be accomplished by any mixture of general purpose processors (GPUs), Field Programmable Gate Arrays or Programmable Array Logic (FPGAs/PLAs), vector processors, or graphics processing units, such that the throughout, dynamic range, and digital precision is sufficient to accomplish the desired mathematical operations. From an architectural viewpoint, the plurality of frame data may be viewed as set of complex column vectors of length N, with the IFFT/IDFT and FFT/DFT operations being viewed as NxN complex matrices, so that the core modulation and demodulation functions may be accomplished via a set of ordinary matrix multiplies.

The Discrete Hermetic Transform matrix and its inverse can be used for OFDM signaling in place of the conventional Fourier Transform operations. (See U.S. patent applications Ser. No. 13/958,416, "Devices and methods using the hermetic transform for transmitting and receiving signals using OFDM" and U.S. patent applications Ser. No. 14/875,600, "Devices and methods using the hermetic transform for transmitting and receiving signals using OFDM," which are incorporated by reference herein in their entirety, for additional background). The Hermetic Transform is mathematically similar to the Discrete Fourier Transform, but offers extra frequency resolution when as the signal is sufficiently oversampled relative to the minimum Nyquist Rate. Accordingly, an OFDM type system, as described in the referenced patent, may be constructed using signaling channels that are more closely spaced than conventional orthogonal signaling would allow. The normal frequency spacing in a conventional OFDM system is dictated by the Fourier uncertainty principle, where orthogonal spacing of frequencies is at spacing $\Delta F=1/\Delta T$, where $\Delta F$ is the Fourier orthogonal spacing in Hz and $\Delta T$ is the frame duration in seconds. The value for N (the number of orthogonal signaling channels in conventional OFDM) is then $W/\Delta F$ where W is the channel bandwidth in Hz. Use of the Hermetic Transform thus increases the value for N and as a result, increases the data carrying capacity accordingly. The resulting type of OFDM can be referred to as Hermetic OFDM or HOFDM. It is also possible to construct spatially orthogonal channels as well using Hermetic Transforms, using a technique known as Hermetic Beam-Forming and it should be noted that the two methods can be combined to allow even more data to be carried in a telecommunications network. (See U.S. patent applications Ser. No. 14/875,600 for additional background).

System and Method of Making a Hermetic Transform to Mitigate Noise and of Mitigation of Communications Channel Filtering As an alternative to the methods of applying a noise compensation matrix prior to demodulation with a Hermetic Transform, means of compensating for the effects of noise in the communications channel can be incorporated directly into the method of creation of the Hermetic Transform. This type of approach develops the transform from calibration signals in the presence of noise, either real or simulated. In some embodiments, signal data to be demodulated is processed with a Discrete Hermetic Transform (DHT) that is developed from a known sequence of data signals in order to develop a DHT that is robust to the noise environment. This DHT can be updated continuously as frames of data are processed or intermittently as the noise environment changes. This approach can be utilized instead of, or in addition to, the compensation for noise using classical noise mitigating filter techniques.

Additionally, the deleterious effects of channel filtering in the signal processing chain as well as in the intervening medium through which the signal propagates between the transmitting and receiving ends of the communications link can be addressed. In some embodiments, a known set of calibration signals is transmitted and processed at the receiving end in order to infer the effects of channel filtering (channel transfer function). The mitigation of these channel filtering effects can be incorporated into the design of the Hermetic Transform by "training" it to accommodate the measured effects of channel filtering. Additionally, in some embodiments, the channel can be estimated and removed by inverse filtering the received signals.

FIG. 1 shows a method 100 of making a Hermetic transform to mitigate noise according to an exemplary embodiment. At step 101, signal frames comprising predetermined data and gaps comprising noise are received over a channel. At step 102, the predetermined data is framed. At step 103, a set of linear equations which relate a transfer function matrix F of the channel to the predetermined data is constructed. At step 105, the transfer function matrix F is determined by inverting the linear equations using a first pseudo inverse matrix. At step 106, the transfer function matrix F is incorporated into linear equations for a hermetic transform H. At step 107, the hermetic transform H is determined using a second pseudo inverse matrix based on the predetermined data and the noise. The method steps are described further below and elsewhere in this description.

Figure 2:
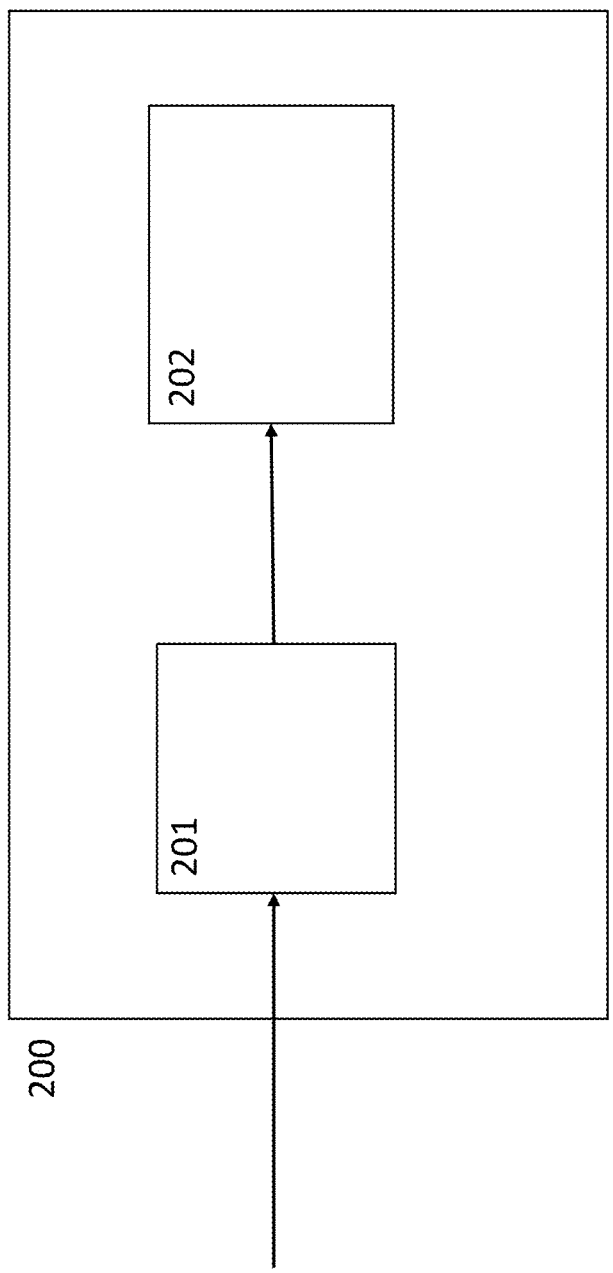
FIG. 2 shows a communications device according to an exemplary embodiment.

FIG. 2 shows a communications device 200 according to an exemplary embodiment. The device comprises a receiver 201 and a processor 202. The receiver is configured to receive over a channel signal frames comprising predetermined data and gaps comprising noise. In some embodiments, the receiver 201 may comprise appropriate hardware and/or software for signal reception and processing. In some embodiments, the receiver may comprise one or more antennas, demodulators, analog-to-digital converts, and other signal processing hardware and/or software. The receiver 201 extracts the predetermined data and gaps comprising noise from the received signal frames. The processor 202 is configured to frame the predetermined data; construct a set of linear equations which relate a transfer function matrix F of the channel to the predetermined data; determine the transfer function matrix F by inverting the linear equations using a first pseudo inverse matrix; incorporate transfer function matrix F into linear equations for a hermetic transform H; and determine the hermetic transform H using a second pseudo inverse matrix based on the predetermined data and the noise. The processor 202 may be implemented with hardware and/or software for processing the data, such as a microprocessor, baseband processor, and/or other signal processing hardware. The communications device 200 may also comprise other suitable hardware and/or software, such as memory (e.g., a non-transitory storage medium) coupled to the processor, receiver, and/or transistor to store processing instructions, received data, data for transmission, and/or other data, buffers, filters, and other communications structures. In some embodiments, one or more components such as a receiver, transmitter, and processor may be combined. In some embodiments, one or more processing steps may be performed by a receiver and/or transmitter. The communication device is described further below and elsewhere in this description.

In some embodiments, the noise-robust, or noise-mitigating form of the Hermetic Transform is used. The fundamental mathematical equation for the Discrete Hermetic Transform (DHT) is:

$$\underline{H}^o \underline{\Sigma} = \underline{I}$$

Here $H^o$ is the Hermetic Transform as developed from a noise free set of channel signals (initial basis). the matrix $\underline{\Sigma}$ is comprised of a set of column vectors, each of which is a channel (basis) signal that can be independently modulated to convey information. Here $\underline{I}$ is the identity matrix.

The Hermetic Transform may also satisfy the following equation, $$\underline{H}\underline{N}=\underline{0}$$

In other words, that the Hermetic Transform is orthogonal to the noise.

One can use multiple noisy references or create them from multiple noise realizations via simulation based on a noise statistics model, in order to construct the following equation:

$$\underline{H}[(\underline{\Sigma}+\underline{N}_1)(\underline{\Sigma}+\underline{N}_2)\ldots]=[\underline{\Pi}\ldots]=\underline{\rho}$$

where the N1, N2, . . . are independent instances of the additive noise in the channel. From the above expression one can develop an equation that can be solved to create a Hermetic Transform which possesses the desired properties of orthogonalizing the channel signals while rejecting noise.

Defining matrices $\underline{\sigma}$ and $\underline{\Omega}$ with the following equations, $$\underline{\sigma}=[(\underline{\Sigma}+\underline{N}_1)(\underline{\Sigma}+\underline{N}_2)\ldots]$$

$$\underline{H}=\underline{\Sigma}^H\underline{\Omega}$$

the equation obtains, to be solved for the noise conditioned DHT in terms of these variables:

$$\underline{\Sigma}^H\underline{\Omega}\underline{\sigma}=\underline{\rho}$$

In some embodiments, a calibration sequence of known signals is transmitted and then received in the presence of noise, with the above mathematical steps being applied to the received data in order to create the noise robust version of the transform for subsequent application to the demodulation of information bearing signal transmissions.

The matrix $\underline{\Omega}$ (and therefore $\underline{H}$) can be solved for using standard linear algebra via pseudo-inverse matrices derived from the well-known Moore-Penrose Singular Value Decomposition (SVD). A number of other variations of this basic technology will be apparent to one of reasonable skill in the art from this disclosure and are held to be within the scope of the present disclosure.

In some embodiments, if a single channel transfer function matrix ($\underline{F}$) suffices to characterize the channel then the governing equations are:

$$\underline{F}[S1S2S3\ldots]=[R1R2,R3\ldots]$$

Here F is the transfer function matrix to be solved for, {S1, S2, S3, . . . } are a set of frame signals, represented as column vectors, transmitted through the channel, and {R1, R2, R3, . . . } are the corresponding received signal vectors. It is to employ the analytic complex signal representations constructed via a Hilbert Transform of the real part of the transmitted and received signals in order to create {$\underline{S}_i$} and {$\underline{R}_i$}. From the received data {Ri}, the corresponding complex, analytic signals {□} and {□} can then be directly utilized and a complex transfer function matrix calculated from the equation below, or its equivalent:

$$\underline{F}=[\sigma_1\sigma_2\ldots]\{[\rho_1\rho_2\ldots]\}^{\#}$$

In some instances, the apparent channel transfer function may be time varying in a manner which can only be characterized in a statistical sense. In this instance the errors between {Fσi} and {ρi} can be treated as exemplars of a random noise process that represents the combined effects of model noise, ambient noise, and intrinsic system noise. The solution for the Hermetic Transform in this case is given by the following equation:

$$\underline{H}[(\underline{F}\underline{\Sigma}+\underline{N}_1)(\underline{F}\underline{\Sigma}+\underline{N}_2)\ldots]=[\underline{L}\ldots]$$

where the {Ni} represent exemplars of total noise, $\underline{\Sigma}$ the transmitted basis matrix (comprised of the transmitted basis signals as column vectors), and $\underline{F}$the mean transfer function matrix.

Inverting to solve for $\underline{H}$ yields $$H=[\underline{L}\ldots]*[(\underline{F}\underline{\Sigma}+\underline{N}_1)(\underline{F}\underline{\Sigma}+\underline{N}_2)\ldots]^{\#}$$

where # represents the pseudo-inverse in Gelb's notation, nominally obtained via the Singular Value Decomposition (SVD).

Figure 3A:
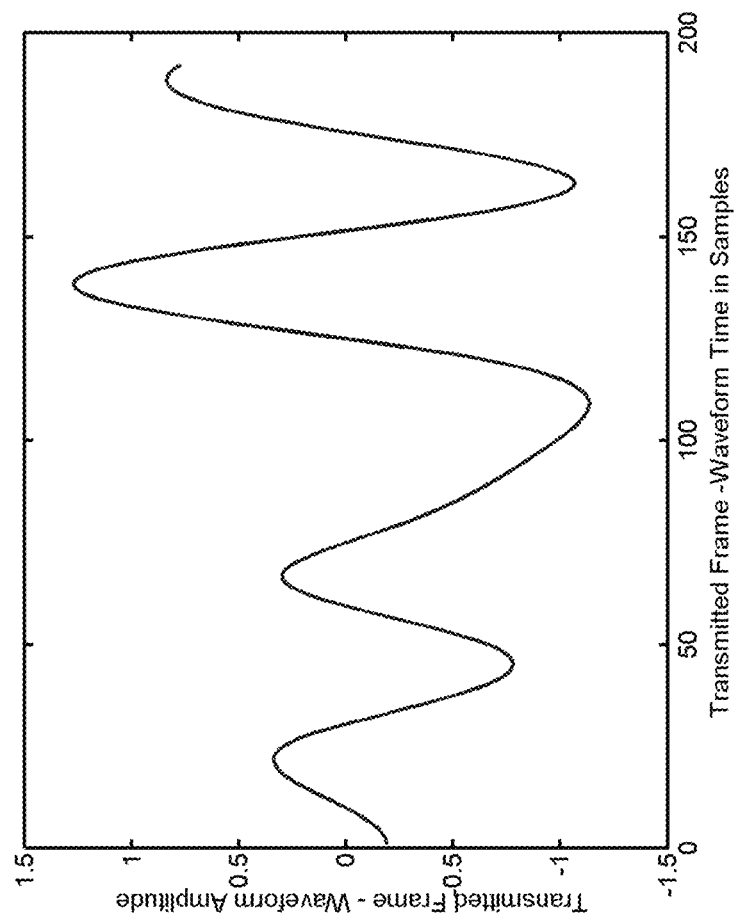
FIG. 3A is an exemplar of a "pure signal" (one frame), prior to transmission.
Figure 3B:
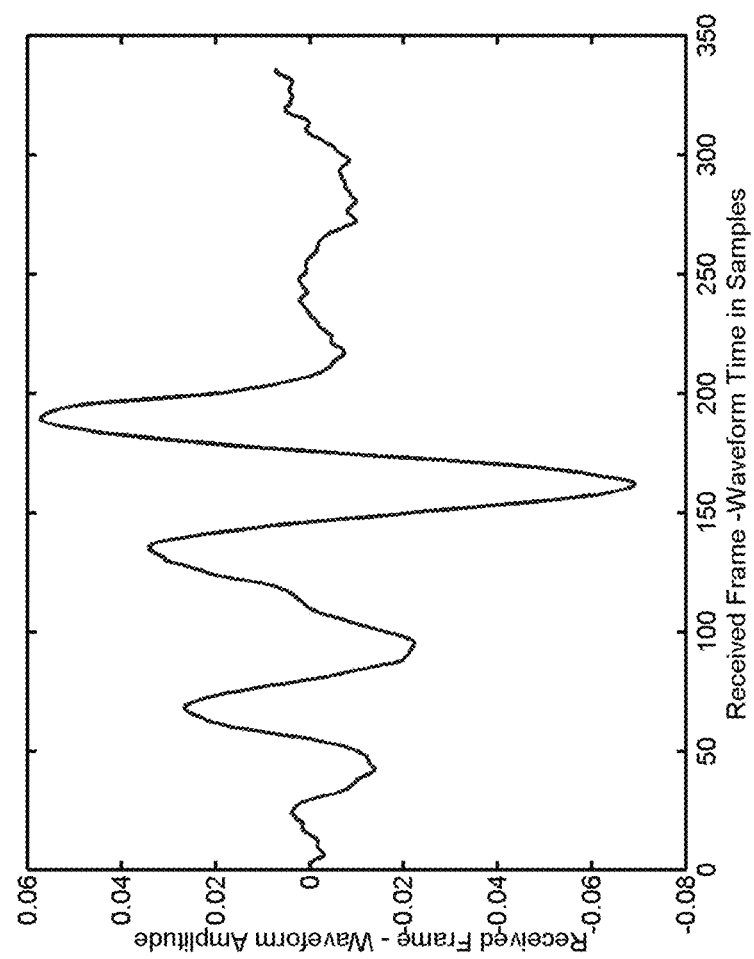
FIG. 3B is presents the same signal after it has experienced channel impairment.
Figure 3C:
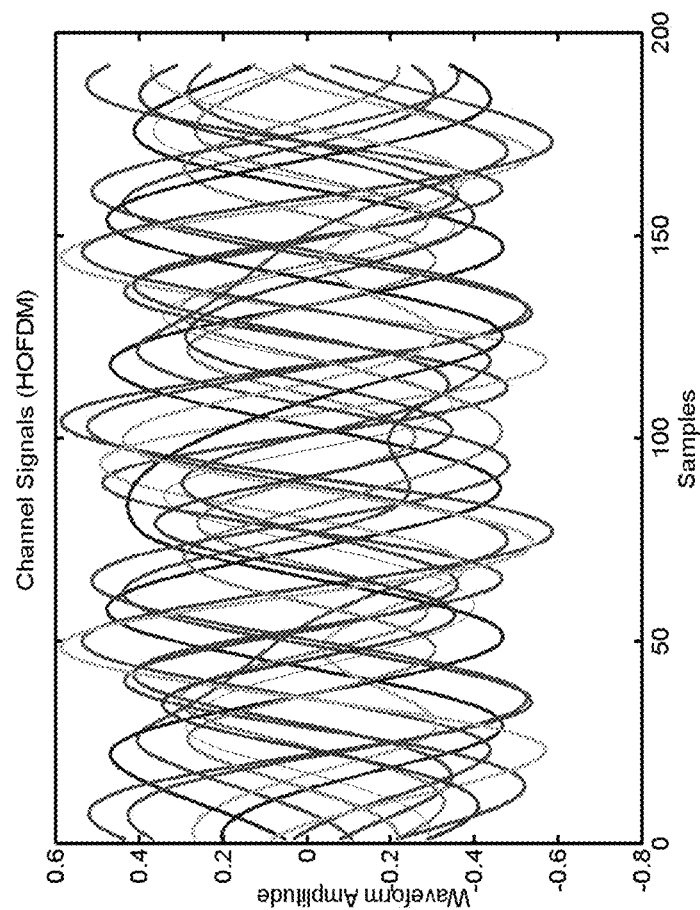
FIG. 3C shows each frame of the signal (in an example) constructed using the real basis functions.

An exemplary case illustrating effects of channel impairment is presented in FIGS. 3A through 3C. The figures show a "pure" HOFDM signal frame prior to transmission; the same signal after it has been incurred channel impairment for a real channel; the real-part of the basis set used for signal frame construction; and the constellation of QAM symbols used to construct modulation vectors for information transmission. FIG. 3A is an exemplar of a "pure signal" (one frame), prior to transmission. FIG. 3B is presents the same signal after it has experienced channel impairment. As shown in FIG. 3C, each frame of the signal (in this example) is constructed using the real basis functions shown below. Each signal is in a separate color; there are 14 independent basis signal, each 192 sample points long. The In-phase and Quadrature (I&Q) components of the transmitted complex signal are fed to a quadrature digital to analog converter. The I&Q components of a signal frame are constructed using the Hilbert Transform of the real basis channel signals, multiplied (post) by the complex (QAM) modulation vector.

Systems and Methods for Distributed Signal Modulation and for Constellation Pre-Distortion Some embodiments for OFDM as well as for Hermetic versions of OFDM (HOFDM) use direct channel modulation. In direct channel modulation, the signal basis matrix $\Sigma$ is multiplied by a column vector of complex symbols taken from a Quadrature Amplitude Modulation (QAM) constellation. Such a direct form is subject to errors due to channel variations in amplitude and/or phase, which can result in an increased bit error rate for a given QAM constellation and signal to noise ratio.

In some embodiments, distributed signal modulation is used to mitigate against transmission impairments in the form of basis to basis (channel signal) variation by distributing each modulation vector over all of the channels. This approach can be applied to both the OFDM and Hermetic forms of OFDM signaling.

Figure 4:
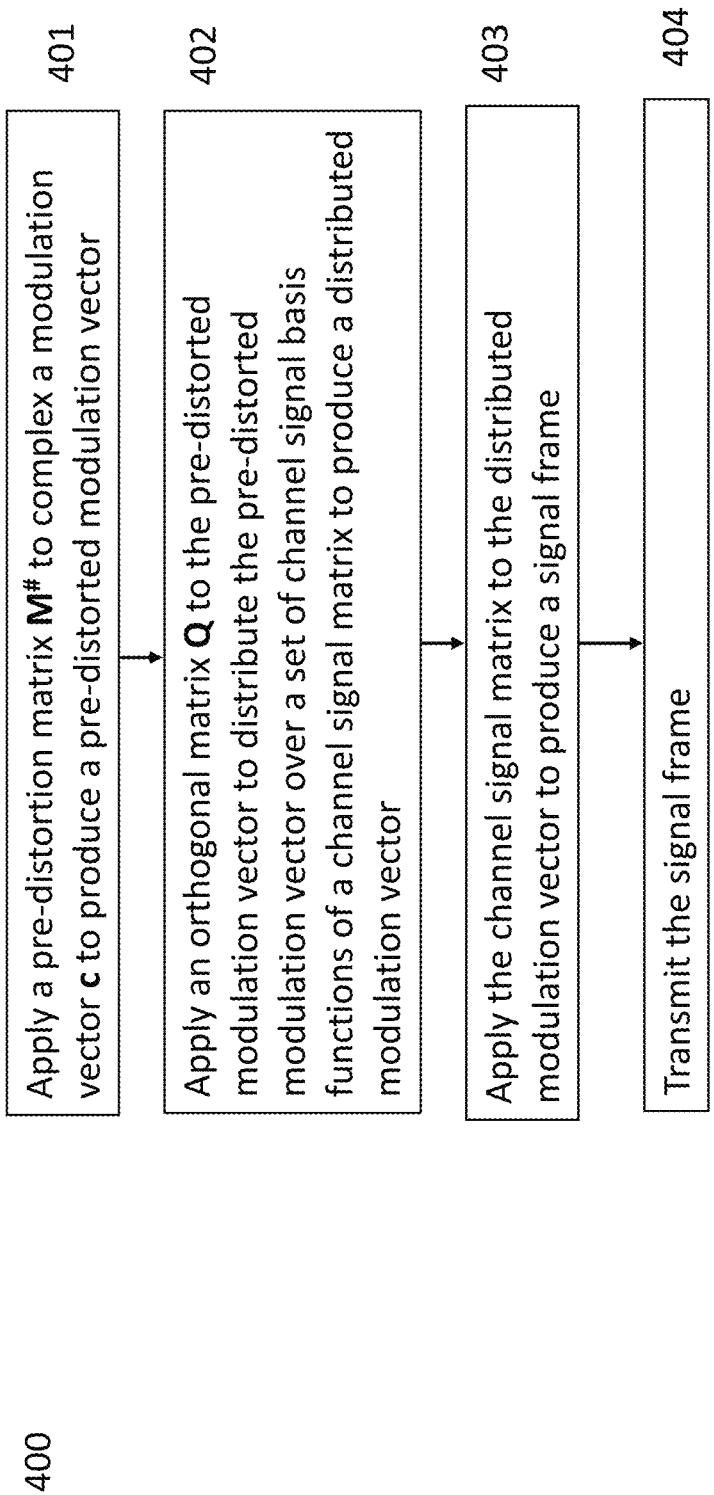
FIG. 4 shows a method of distributing signal modulation in accordance with an exemplary embodiment.

FIG. 4 shows a method 400 of distributing signal modulation in accordance with an exemplary embodiment. In step 401, a pre-distortion matrix $M^{\#}$ is applied to a complex modulation vector c to produce a pre-distorted modulation vector. In step 402, an orthogonal matrix Q is applied to the pre-distorted modulation vector to distribute the pre-distorted modulation vector over a set of channel signal basis functions of a channel signal matrix to produce a distributed modulation vector. In step 403, the channel signal matrix is applied to the distributed modulation vector to produce a signal frame. In step 404, the signal frame is transmitted. The method steps are described further below and elsewhere in this description.

Figure 5:
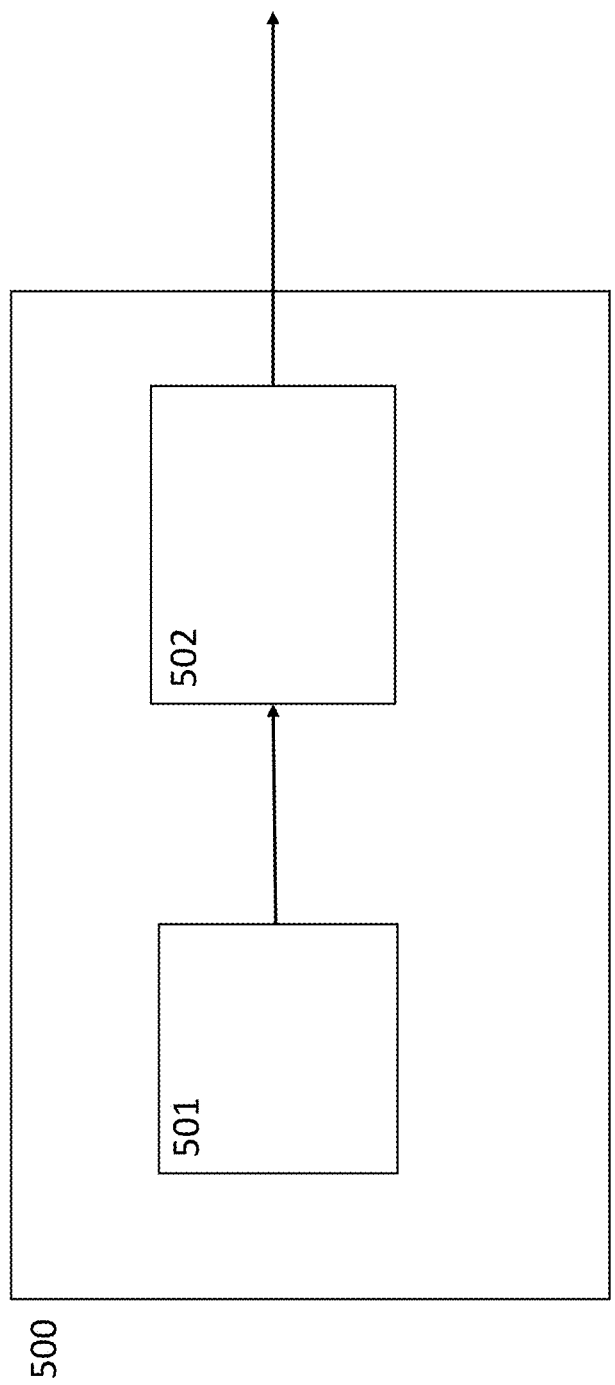
FIG. 5 shows a communication device for distributing signal modulation according to an exemplary embodiment.

FIG. 5 shows a communication device 500 for distributing signal modulation according to an exemplary embodiment. The communication device 500 comprises a processor 501 and a transmitter 502. The processor is configured to apply a pre-distortion matrix $M^{\#}$ to complex a modulation vector c to produce a pre-distorted modulation vector; apply an orthogonal matrix Q to the pre-distorted modulation vector to distribute the pre-distorted modulation vector over a set of channel signal basis functions of a channel signal matrix to produce a distributed modulation vector; apply the channel signal matrix to the distributed modulation vector to produce a signal frame. The transmitter 502 can then transmit the signal frame. In some embodiments, the transmitter 502 may comprise appropriate hardware and/or software for signal processing and transmission. In some embodiments, the receiver may comprise one or more antennas, modulators, digital-to-analog converts, and other signal processing hardware and/or software. The processor 501 may be implemented with hardware and/or software for processing the data, such as a microprocessor, baseband processor, and/or other signal processing hardware. The communications device 500 may also comprise other suitable hardware and/or software, such as memory (e.g., a non-transitory storage medium) coupled to the processor, receiver, and/or transistor to store processing instructions, received data, data for transmission, and/or other data, buffers, filters, and other communications structures. In some embodiments, one or more components such as a receiver, transmitter, and processor may be combined. In some embodiments, one or more processing steps may be performed by a receiver and/or transmitter. The communication device is described further below and elsewhere in this description.

Figure 6:
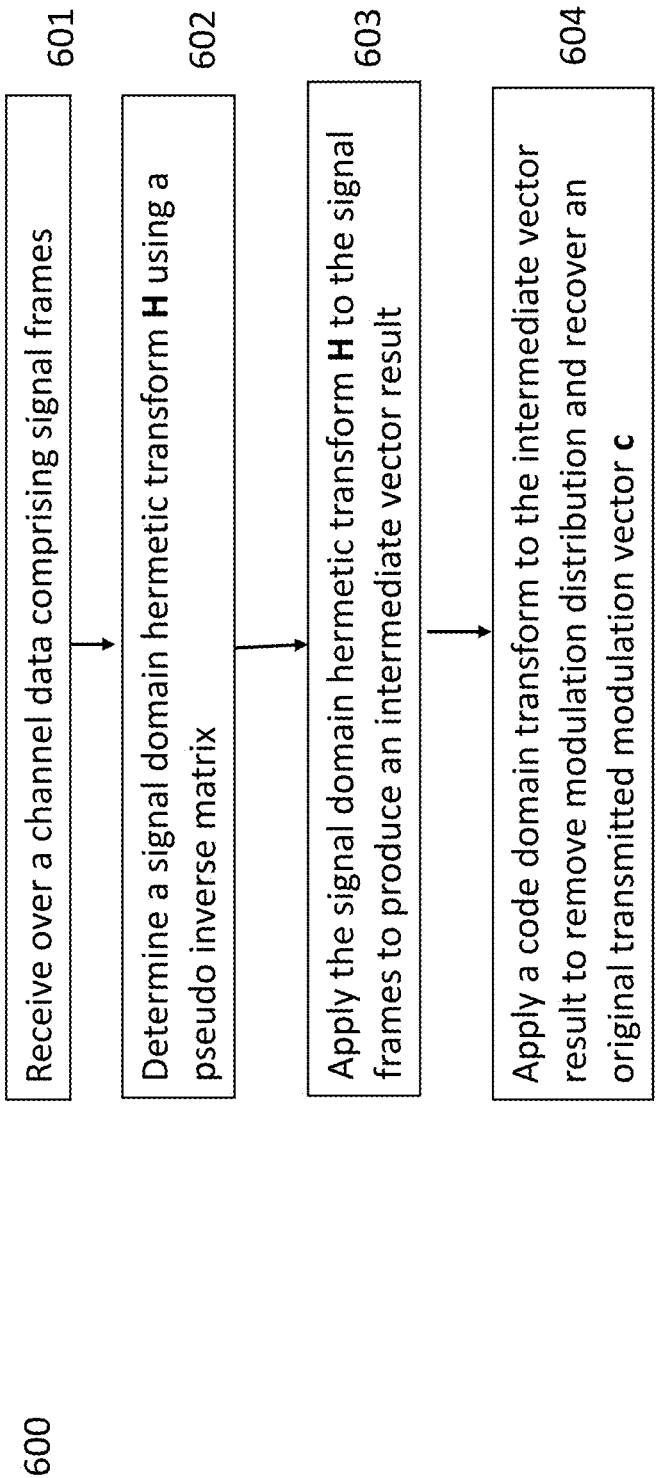
FIG. 6 shows a method for receiving distributed signal modulation.

FIG. 6 shows a method 600 for receiving distributed signal modulation. In step 601, signal frame are received over a channel. In step 602, a signal domain hermetic transform H is determined using a pseudo inverse matrix. In step 603, the signal domain hermetic transform H is applied to the signal frames to produce an intermediate vector result. In step 604, a code domain transform is applied to the intermediate vector result to remove modulation distribution and recover an original transmitted modulation vector c. The method steps are described further below and elsewhere in this description.

Figure 7:
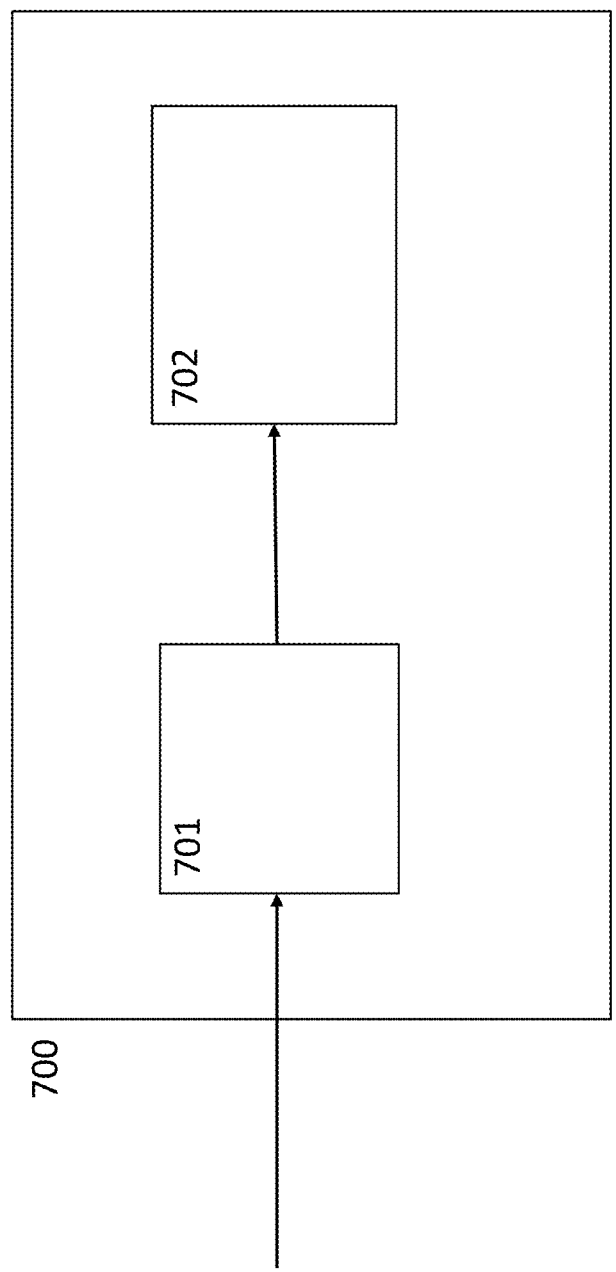
FIG. 7 shows a communication device for receiving distributed signal modulation.

FIG. 7 shows a communication device 700 for receiving distributed signal modulation. The apparatus comprises a receiver 701 and a processor 702. The receiver 701 is configured to receive over a channel data comprising signal frames. In some embodiments, the receiver 701 may comprise appropriate hardware and/or software for signal reception and processing. In some embodiments, the receiver may comprise one or more antennas, demodulators, analog-to-digital converts, and other signal processing hardware and/or software. The receiver 201 extracts the predetermined data and gaps comprising noise from the received signal frames. The processor 702 is configured to determine a signal domain hermetic transform H using a pseudo inverse matrix; apply the signal domain hermetic transform H to the signal frames to produce an intermediate vector result; and apply a code domain transform to the intermediate vector result to remove modulation distribution and recover an original transmitted modulation vector c. The communications device 700 may also comprise other suitable hardware and/or software, such as memory (e.g., a non-transitory storage medium) coupled to the processor, receiver, and/or transistor to store processing instructions, received data, data for transmission, and/or other data, buffers, filters, and other communications structures. In some embodiments, one or more components such as a receiver, transmitter, and processor may be combined. In some embodiments, one or more processing steps may be performed by a receiver and/or transmitter. The communication device is described further below and elsewhere in this description.

In some embodiments, a complex valued matrix $\underline{Q}$ having column vectors consisting of orthogonal column vectors $\{\underline{q}_i\}$ with are orthogonal according to the criteria may be defined as $$\underline{q}_i^H \underline{q}_j = \delta_{ij} = \{1 \text{ if } i=j, 0 \text{ otherwise}\}$$

Accordingly $\underline{Q}^H \underline{Q} = \underline{I}$. The default size of the matrix is N×N where N is the number of basis signals (number of channels). In one variant of this embodiment, a set of not necessarily orthogonal vectors comprised of random combinations of constellation symbol values are orthogonalized using the standard approach using on SVD.

In some embodiments, distributed HOFDM transmission uses a set of orthogonal vectors with the above properties. Instead of multiplying the signal basis by the complex symbol vector directly, the signal basis is multiplied by a vector $\underline{c}$ comprised of a linear combination of the orthogonal vectors, $$\underline{c} = \Sigma_i \underline{q}_i$$

This process can be equivalent to multiplying the signal basis first by the orthogonal matrix $\underline{Q}$ and then by the desired complex vector of constellation symbols.

Figure 8:
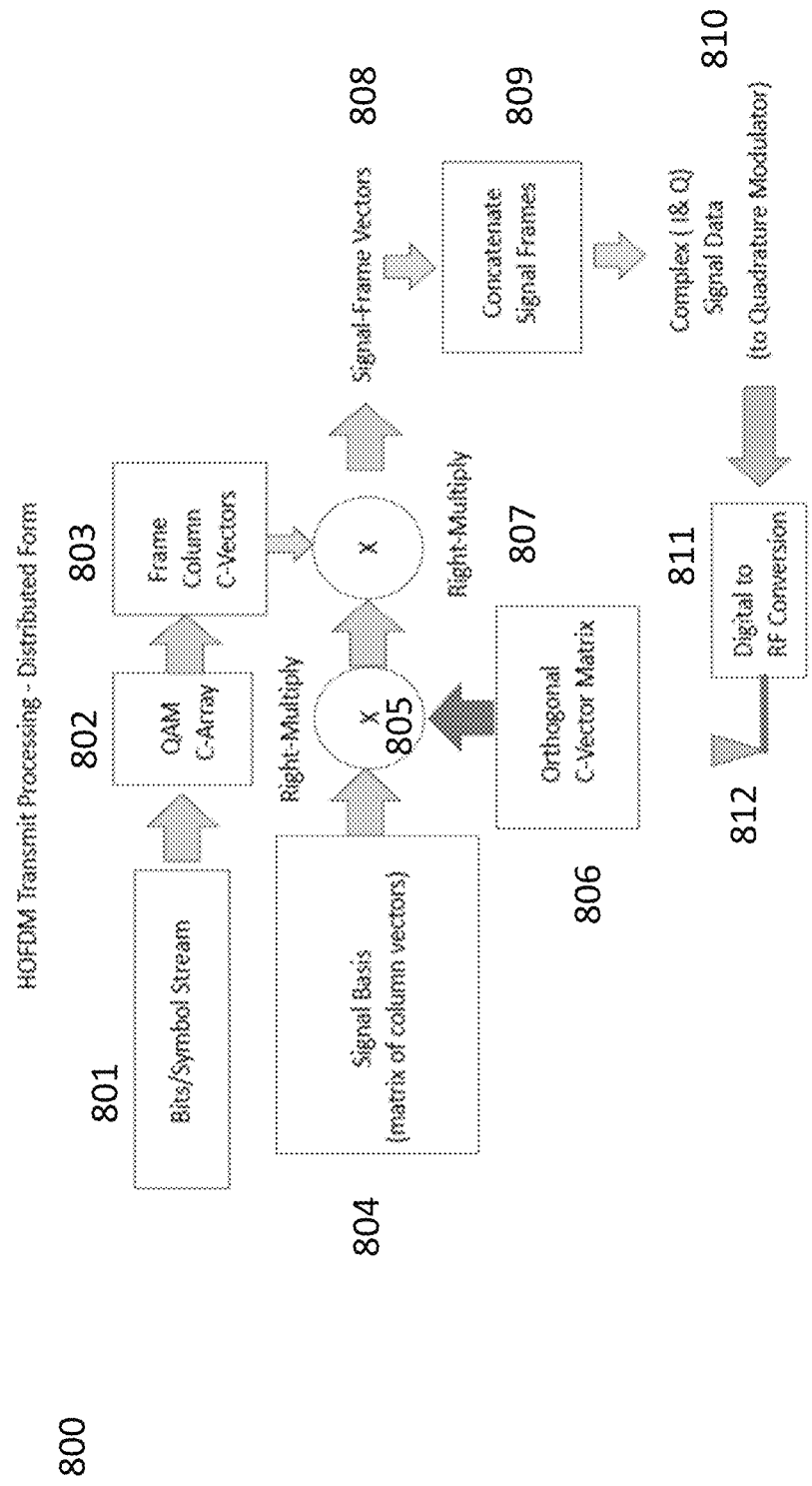
FIG. 8 shows the modified transmit process for the case of distributed HOFDM in accordance with an exemplary embodiment.

FIG. 8 shows the modified transmit process 800 for the case of distributed HOFDM in accordance with an exemplary embodiment. A bit/symbol stream 801 is applied to a QAM c-array 802. The output of the QAM C-array 802 is applied to Frame Column C-Vectors 803. Additionally, a multiplier 805 preforms a right-multiply operation with Signal Basis vectors 804 and an Orthogonal C-Vector Matrix 806. The multiplier 807 performs a right-multiply operation with the output of the multiplier 805 and the Frame Column C-Vectors 803 to produce Signal-Frame Vectors 808. A concatenator 809 concatenates the Signal-Frame Vectors 808 to produce complex (I&Q) Signal Data 810. The complex (I&Q) Signal Data 810 is then applied to a digital to RF converter to apply quadrature modulation and digital to RF conversion. Transmitter 812 then transmits the signal.

In some embodiments, a reverse process is used to recover the symbol information. The equation for signal frame creation is, $$\underline{S}^0 = \underline{\Sigma} \underline{Q} \underline{c}$$

Here $\underline{S}^0$ is the frame signal vector, $\underline{\Sigma}$ is the signal basis, Q is the orthogonal matrix, and $\underline{c}$ the complex symbol vector being transmitted. The equation for recovering c for the ideal, no-noise case is the following:

$$\underline{c} = \underline{Q}^H \underline{H}^0 \underline{S}^0 = \underline{\Gamma}^0 \underline{S}^0 \ \underline{\Gamma}^0 = \underline{Q}^H \underline{H}^0$$

Here $\underline{H}^0$ is the noise-free Hermetic Transform created from the signal basis.

Figure 9:
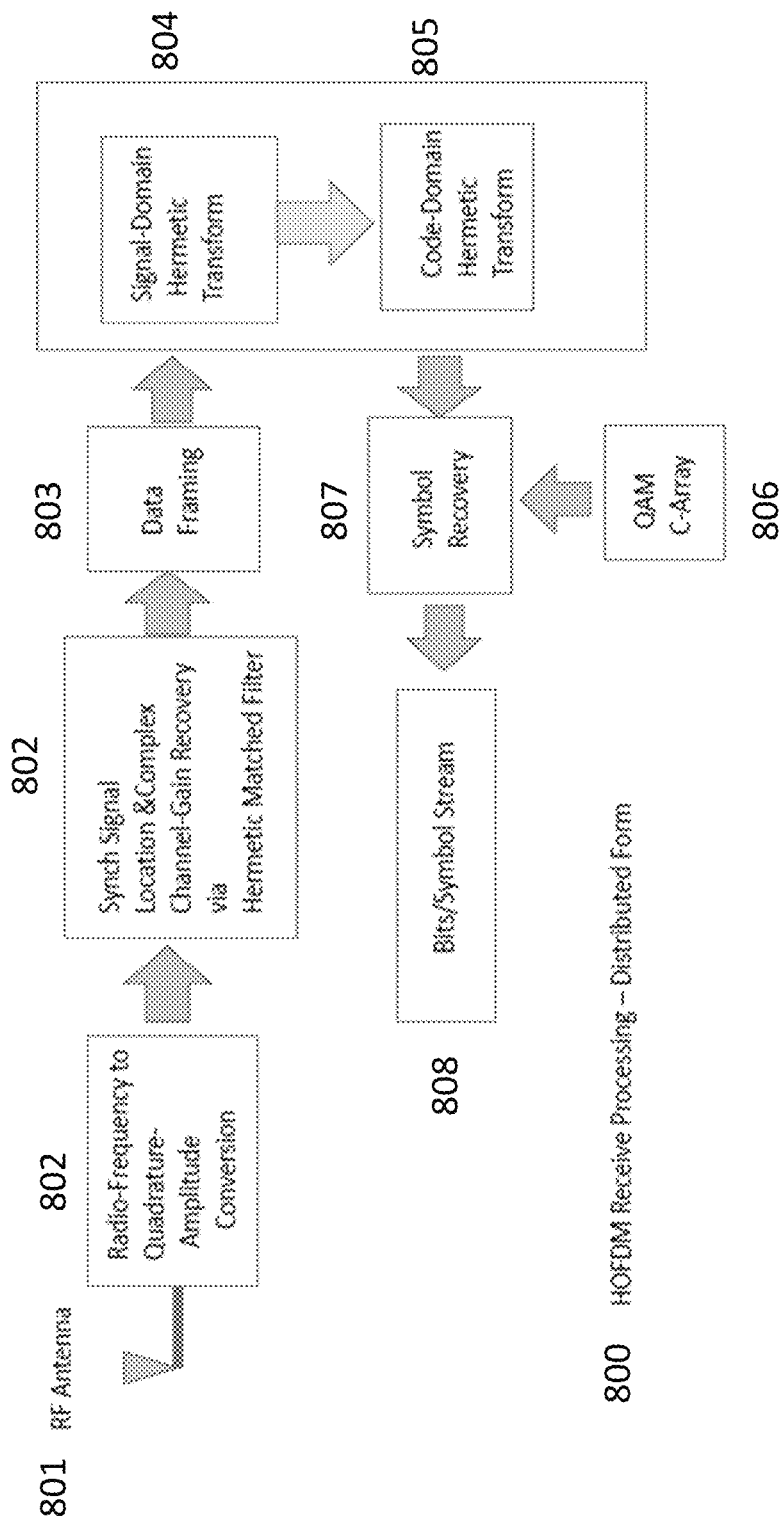
FIG. 9 shows a block diagram for a receiver to recover the symbol information according to an exemplary embodiment.

FIG. 9 shows a block diagram for a receiver to recover the symbol information according to an exemplary embodiment. An antenna 801 receives a signal and a Radio Frequency (RF) to Quadrature-Amplitude converter applies RF Quadrature-Amplitude conversion to the signal. The output of the converter 802 is applied to a data framer 803 to apply data framing. The output of data framer 803 is applied to a hermetic transform block 804 which applies a signal domain hermetic transform and then to a hermetic transform block 805 which applies a code domain hermetic transform. A block 807, the output of the hermetic transform block 805 is combined with a QAM C-Array 806 to perform symbol recovery 807 to obtain the bits/symbol stream 808.

In some embodiments, the noise-conditioned signal-domain Hermetic Transform $\underline{H}$ replaces $H^0$ and a code-domain Hermetic Transform matrix replaces $\underline{Q}^H$. The code-domain Hermetic Transform is designed to be conditioned against code-domain noise in performing the analogous function to $\underline{Q}^H$.

To derive the code-domain DHT (CDDHT), one can first start by defining a quantity $\chi$ as follows:

$$\chi = \underline{\Sigma}\underline{Q}$$

For the noise free case, $S^0 = \chi \underline{c}$. One can then examine the results of applying the Hermetic Transform H to a set of noise-corrupted versions of $\chi$:

$$[\underline{V}_1 \ \underline{V}_2 \ldots] = \underline{H}[(\underline{\Sigma}+\underline{N}_1)(\underline{\Sigma}+\underline{N}_2)\ldots)\underline{Q}]$$

which can be restated as the following:

$$[\underline{V}_1 \ \underline{V}_2 \ldots] = \underline{H}[(\chi+\underline{n}_1)(\chi+\underline{n}_2)\ldots]$$

One can design a transform $\psi$ that, when applied to the operators $\{V_i\}$ produce the identity matrix. Note that this results in recover of the complex symbol vector $\underline{c}$. In mathematical terms, $$\psi[\underline{V}_1 \ \underline{V}_2 \ldots] = [\underline{\Pi}\ldots]$$

By analogy one can define the transform $\psi$ in relation to $\underline{Q}^H$:

$$\psi = \underline{Q}^H \underline{\Omega}$$

Upon substitution into the above relations defining the relationship of $\psi$ to $\{V\}$, the resulting equation for W can be solved using the standard methods of linear algebra using the SVD derived pseudo inverses.

$$\Gamma = \underline{Q}^H \underline{\Omega} H$$

The result is a matrix $\underline{\Gamma}$, as shown in the above equation, which replaces the $\underline{\Gamma}^0$ term of the noise-free distributed HOFDM case. Applying $\underline{\Gamma}$ to the noisy HOFDM signal retrieves the complex symbol vector, which can then be used to recover the transmitted digital data.

In some embodiments, systems and methods disclosed herein mitigate distortion of the received QAM constellation positions which can occur during demodulation. One can define a pre-distortion matrix $\underline{M}$, $$\underline{M} = \underline{\Gamma}\chi = \underline{Q}^H \underline{\Omega} H \underline{\Sigma} \underline{Q}$$

The matrix $\underline{M}$ represents distortion effects on the observed constellation symbol positions relative to the transmitted values. This type of pre-distortion is in no way related on another common use of the term, wherein nonlinear amplifier effects in a signal processing chain are mitigated by pre-distorting the signal input. Here the several steps obtained in demodulation of an HOFDM signal produces a warping of the mean position of the QAM constellation. In order to recover the symbols according to the designed for constellation, the symbols transmitted are pre-distorted to produce the correct result. As a result, the signal generation equation used in the direct form of HOFDM are modified for the distributed case, according to the following equation:

$$\underline{S} = \underline{\Sigma}\underline{Q}[\underline{M}^H \underline{c}]$$

Here $M^\#$ is a pre-distortion matrix (filter) comprised of the pseudo-inverse of $\underline{M}$. The pseudo-inverse may be stabilized by adjustment of the singular values of M and/or reduced rank approximation of $\underline{M}$.

When applied together, the code-domain transform, and Hermetic Transform are equivalent to one generalized Hermetic Transform which takes into account all of the above factors.

Systems and Methods for Parallel-DHT Demodulation

In some embodiments, a set of parallel Discrete Hermetic Transforms (DHT) which are each trained on a subset of the possible modulation vector instantiations can be used to construct a demodulator using Hermetic Transforms.

Figure 10:
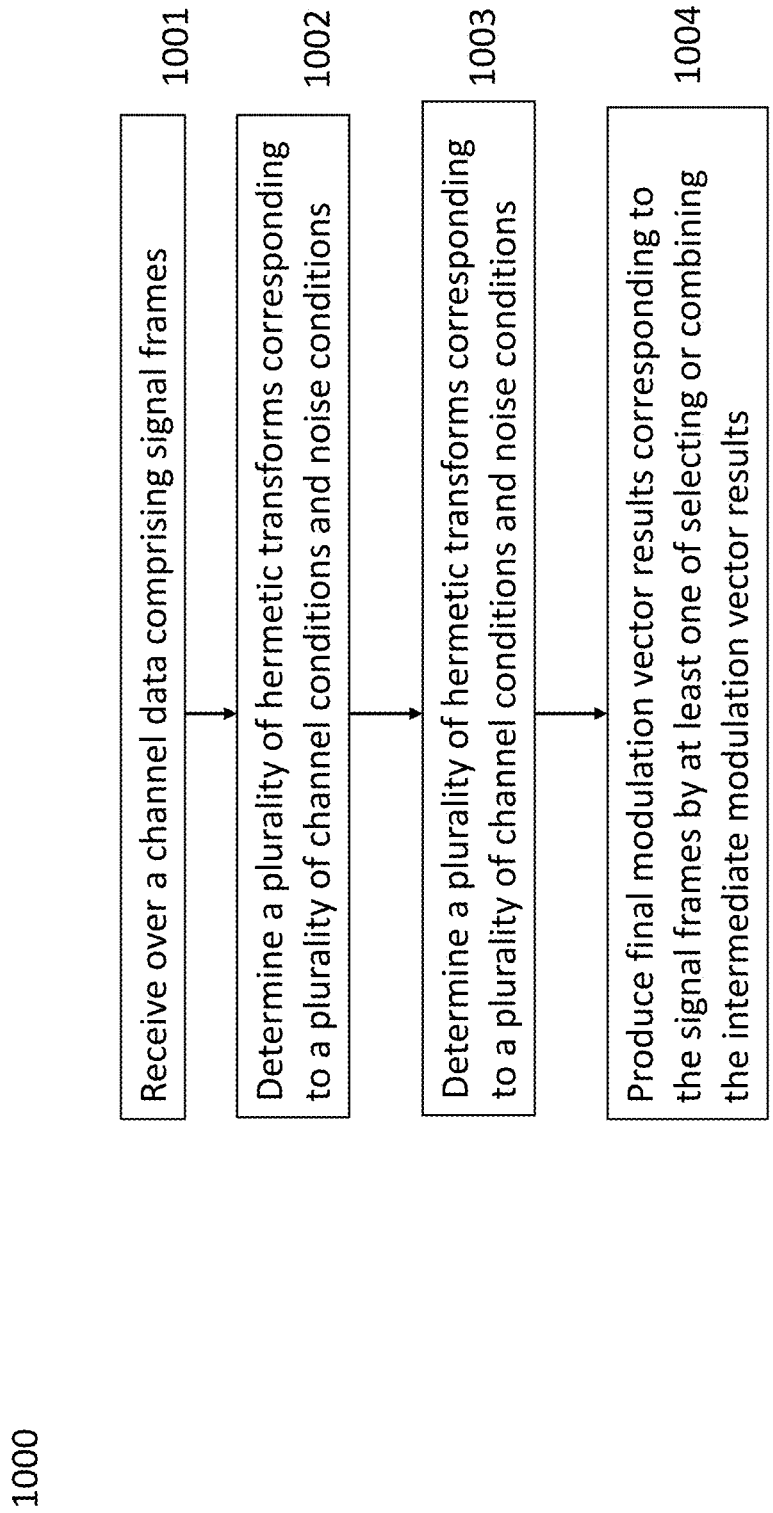
FIG. 10 shows a method of parallel discrete hermetic transform demodulation according to an exemplary embodiment.

FIG. 10 shows a method of parallel discrete hermetic transform demodulation 1000 according to an exemplary embodiment. In step 1001, channel data comprising signal frames are received. In step 1002, a plurality of hermetic transforms corresponding to a plurality of channel conditions and noise conditions are determined. In step 1003, the plurality of hermetic transforms are applied to the signal frames to produce a plurality of intermediate modulation vector results. In step 1004, final modulation vector results are produced corresponding to the signal frames by at least one of selecting or combining the intermediate modulation vector results. In some embodiments, the method further comprises determining a set of weights to be applied to the intermediate modulation vector results, wherein the weights are selected to minimize a total square distance between the final modulation vector results and a constellation; applying the weights to each of the intermediate modulation vector results to produce weighted intermediate modulation vector results; and summing the weighted intermediate modulation vector results to produce the final modulation vector results. In some embodiments, the method further comprises selecting the intermediate modulation vector results which minimize a total square distance between the final modulation vector results and a constellation. The method steps are described further below and elsewhere in this description.

Figure 11:
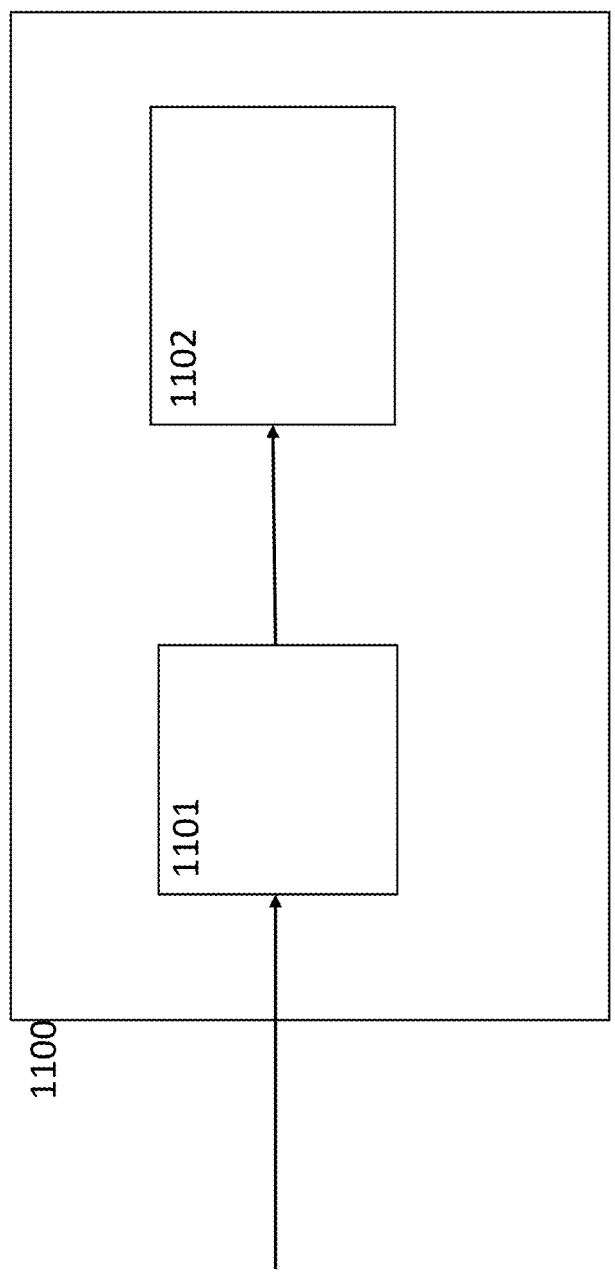
FIG. 11 shows a communication device for parallel discrete hermetic transform demodulation.

FIG. 11 shows a communication device 1100 for parallel discrete hermetic transform demodulation. The apparatus comprises a receiver 1101 and a processor 1102. The receiver receives over a channel data comprising signal frames. In some embodiments, the receiver 1101 may comprise appropriate hardware and/or software for signal reception and processing. In some embodiments, the receiver 1101 may comprise one or more antennas, demodulators, analog-to-digital converts, and other signal processing hardware and/or software. The receiver 1101 extracts the predetermined data and gaps comprising noise from the received signal frames. In some embodiments, the processor 1102 is configured to: determine a plurality of hermetic transforms corresponding to a plurality of channel conditions and noise conditions; determine a plurality of hermetic transforms corresponding to a plurality of channel conditions and noise conditions; and produce final modulation vector results corresponding to the signal frames by at least one of selecting or combining the intermediate modulation vector results. In some embodiments, the processor 1102 is further configured to determine a set of weights to be applied to the intermediate modulation vector results, wherein the weights are selected to minimize a total square distance between the final modulation vector results and a constellation; apply the weights to each of the intermediate modulation vector results to produce weighted intermediate modulation vector results; and sum the weighted intermediate modulation vector results to produce the final modulation vector results. The processor 1102 may be implemented with hardware and/or software for processing the data, such as a microprocessor, baseband processor, and/or other signal processing hardware. The communications device 1100 may also comprise other suitable hardware and/or software, such as memory (e.g., a non-transitory storage medium) coupled to the processor, receiver, and/or transistor to store processing instructions, received data, data for transmission, and/or other data, buffers, filters, and other communications structures. In some embodiments, one or more components such as a receiver, transmitter, and processor may be combined. In some embodiments, one or more processing steps may be performed by a receiver and/or transmitter. The communication device is described further below and elsewhere in this description.

Figure 12:
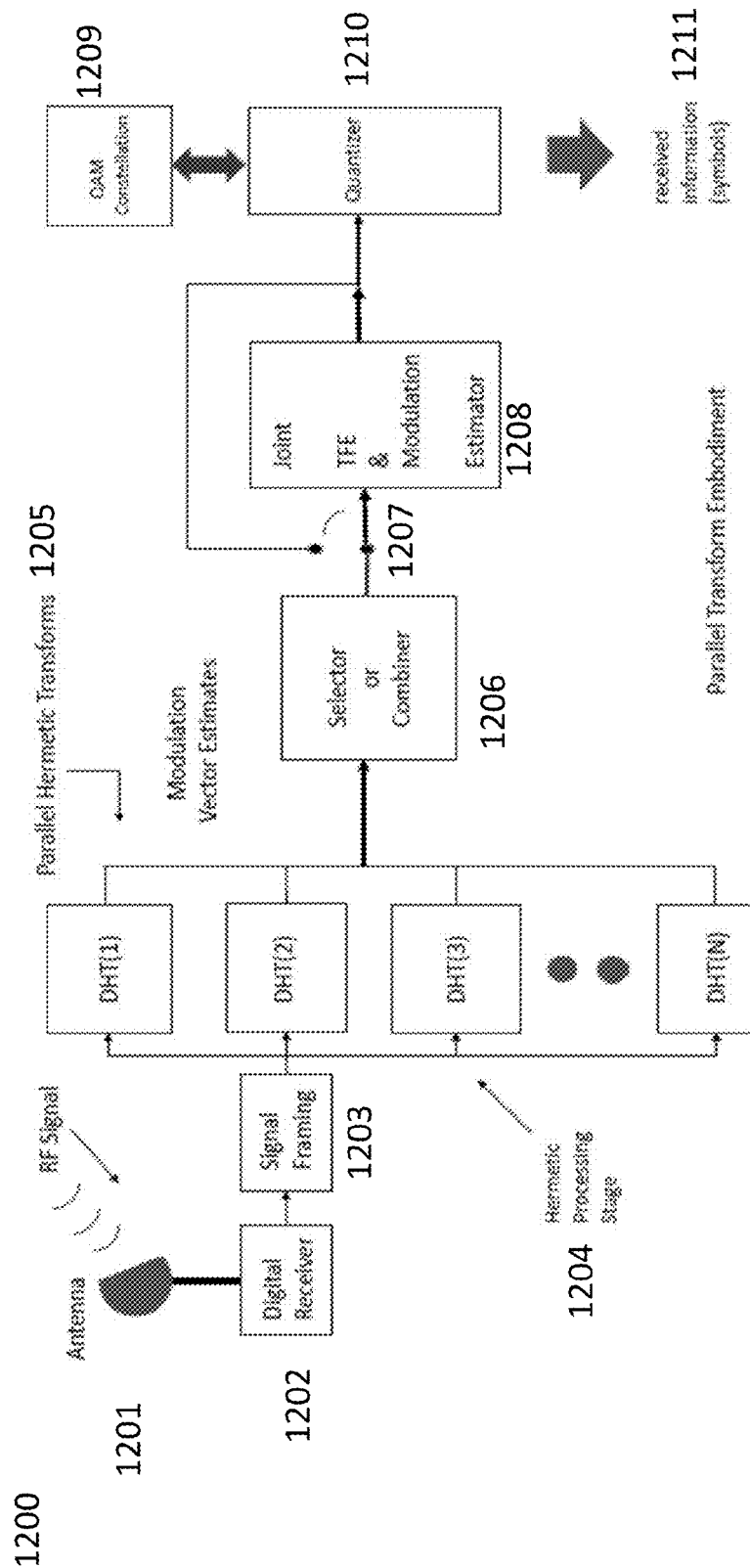
FIG. 12 shows a block diagram for parallel-DHT demodulator according to an exemplary embodiment.

FIG. 12 shows a block diagram for parallel-DHT demodulator 1200 according to an exemplary embodiment. Antenna 1201 and digital receiver 1202 receiver an RF signal. Signal framer 1203 performs signal framing on the signal and sends the output to the Hermetic Processing stage 1204. The Hermetic Processing stage 1204 comprises parallel discrete hermetic transform blocks 1205, which can perform modulation vector estimates by computing parallel discrete hermetic transforms. The output from the Hermetic Processing stage 1204 is sent to the selector or combiner 1206, which performing selecting and/or combining operations on the output. The output of the selector or combiner 1206 is sent to the Joint TFE & Modulation Estimator 1208, which performs TFE and modulation estimation. In some embodiments, the Joint TFE & Modulation Estimator 1208 may be bypassed using switch 1207. The quantizer 1210 receives the output from the Joint TFE & Modulation Estimator 1208 (or from the selector or combiner 1206 if the Joint TFE & Modulation Estimator 1208 is bypassed). The Quantizer 1210 applies a QAM constellation 1209 to the output to produce the received information (symbols) 1211.

In some embodiments, signally framing may be important to the process of demodulation. Signal framing may be accomplished using Hermetic Matched Filter (HMF) processing. Hermetic Matched Filter processing is the Hermetic signal processing analog to replica correlation, but has significantly higher time resolution. HMF processing is utilized in order to locate particular signal frames that act as synchronization 'anchors'.

Each signal frame is generated in a time synchronous fashion with time gaps sufficient to allow for a time-spread channel, if appropriate. The exemplary signal frames presented in the figures above, represent a significant amount of time spreading.

A set of DHT matrices generated from particular subsets of calibration data are generated and used in real-time processing to accomplish parallel demodulation attempts that are reconciled by selection criteria or by appropriate combination approaches. Clustering of the multi-channel complex modulation vectors of calibration data, e.g. using the well-known K-Means algorithm with a Euclidean distance metric, is one example of an approach for separating the signals to produce a set of Hermetic Transforms from corresponding sets of transmitted and received signal data.

After framing, each frame signal segment is multiplied by the set of DHTs, in parallel, and a selection criterion is utilized in order to choose the best result. One exemplary criterion is the sum of the squared distances of the complex demodulation vector relative to the constellation symbol locations. In other words, the demodulation result which most closely aligns with the QAM constellation can be chose as the best demodulation alternative. An alternate approach would be to create a set of weights for optimal combining of the parallel modulation results.

Figure 13:
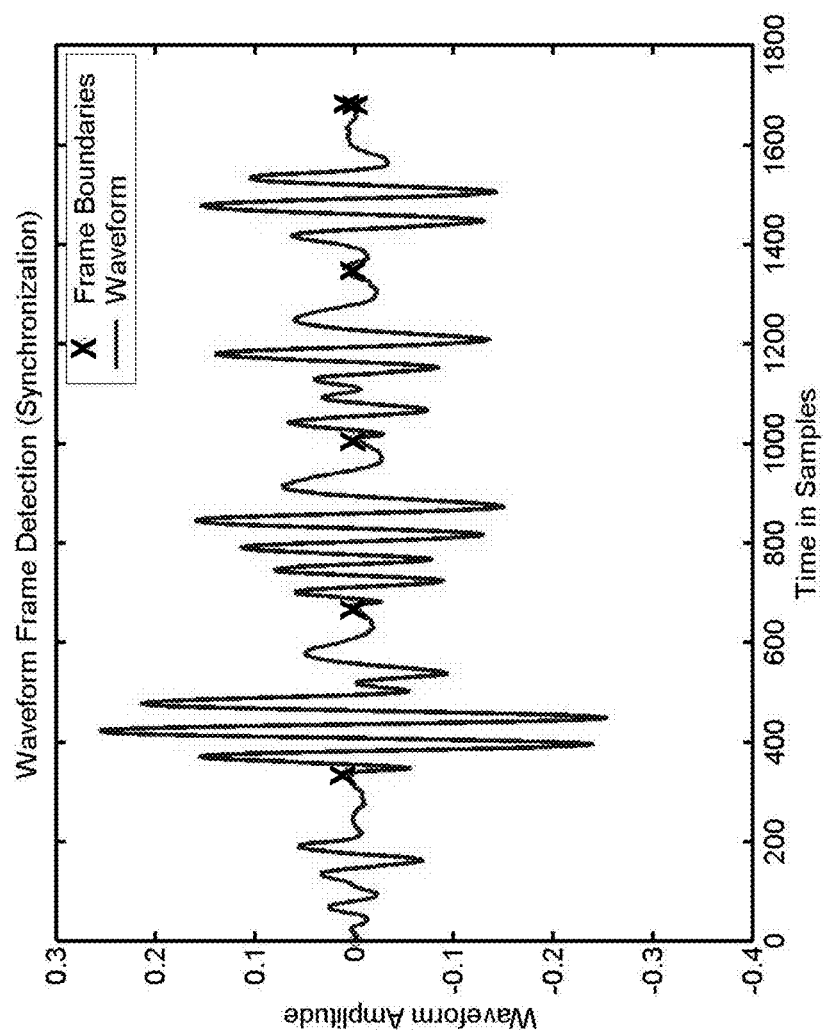
FIG. 13 shows an example of a framed signal with frame boundaries indicated by symbols along points of the waveform according to an exemplary embodiment.
Figure 14:
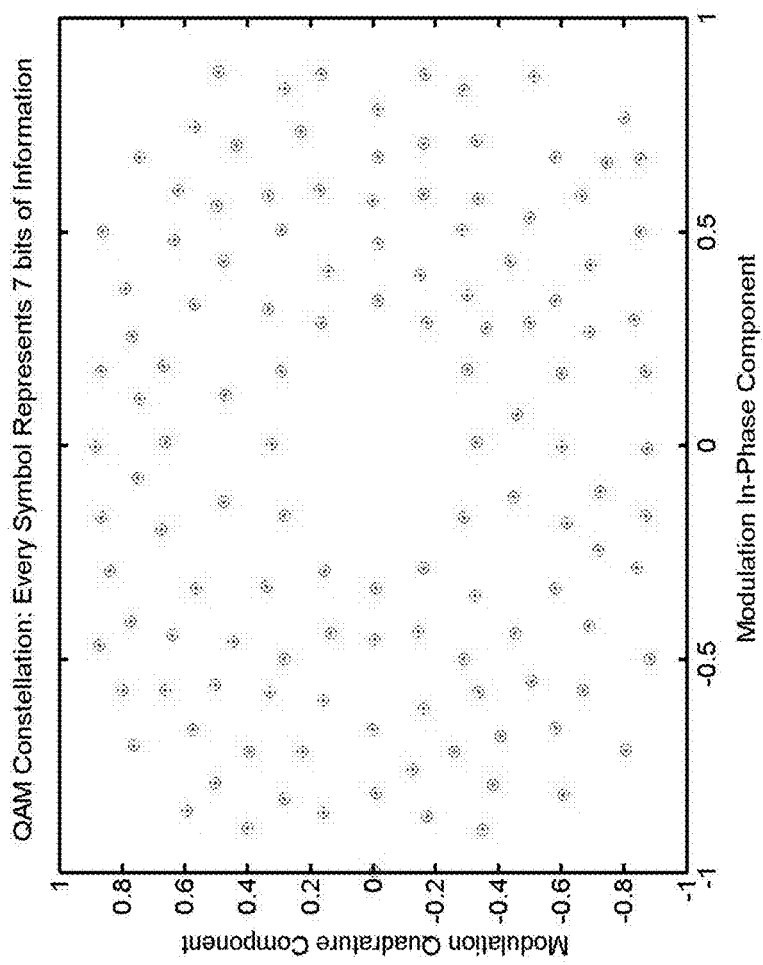
FIG. 14 shows quantization of the complex symbol locations in a demodulation example according to the 128 symbol constellation in accordance with an exemplary embodiment.
Figure 15:
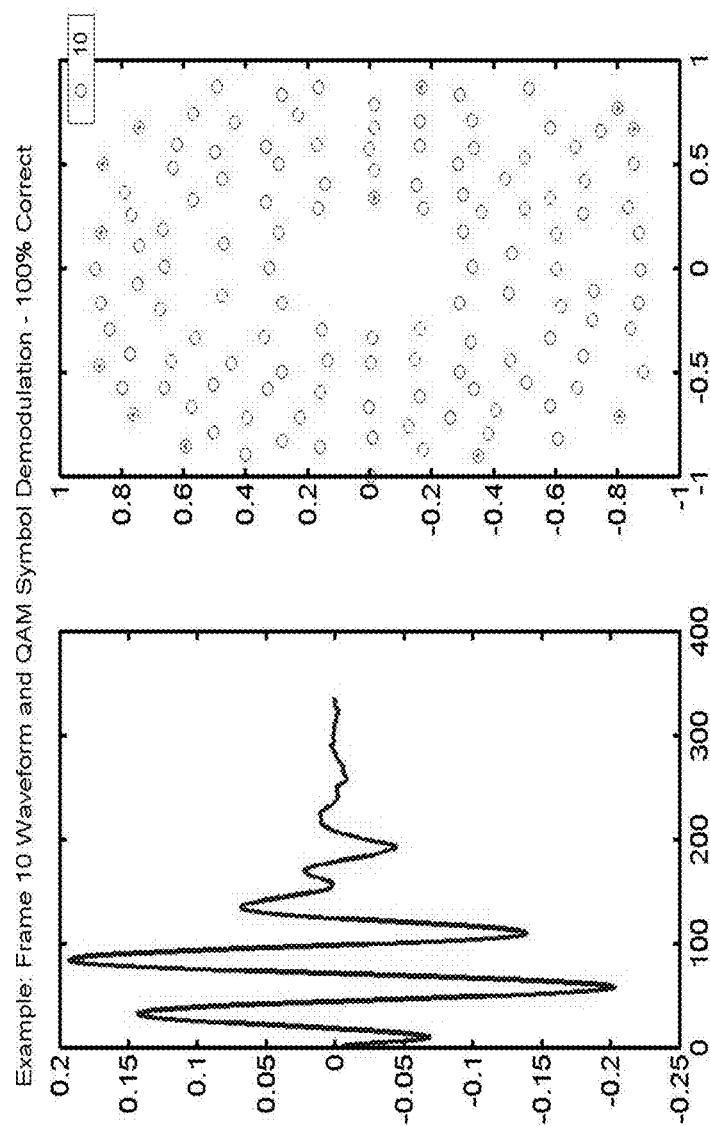
FIG. 15 shows an exemplary demodulation using the parallel DHT approach according to an exemplary embodiment.

FIG. 13 shows an example of a framed signal with frame boundaries indicated by symbols along points of the waveform according to an exemplary embodiment. If transmission gaps are chosen correctly, the received waveform can be constructed so that adjacent frames abut but do not overlap each other, as shown in FIG. 13. FIG. 14 shows quantization of the complex symbol locations in a demodulation example according to the 128 symbol constellation in accordance with an exemplary embodiment. FIG. 15 shows an exemplary demodulation using the parallel DHT approach according to an exemplary embodiment. Empty Circles are possible symbol locations (constellation), Circles with dots are Demodulated Symbol Locations, 'dots' are actual symbol locations (no errors).

Systems and Methods for Signal Framing

In some embodiments, it is desirable to achieve signal framing using information carrying frames, without the addition of separate "time anchor" synchronization frames. A set of parallel HMFs can be constructed from subsets of the possible modulation vectors, and run in parallel to accomplish synchronization. By picking the HMF having peak response for each time point in the HMF filter(s) output, a composite waveform can be constructed that produces sharp peaks at the frame centers of each frame.

Figure 16:
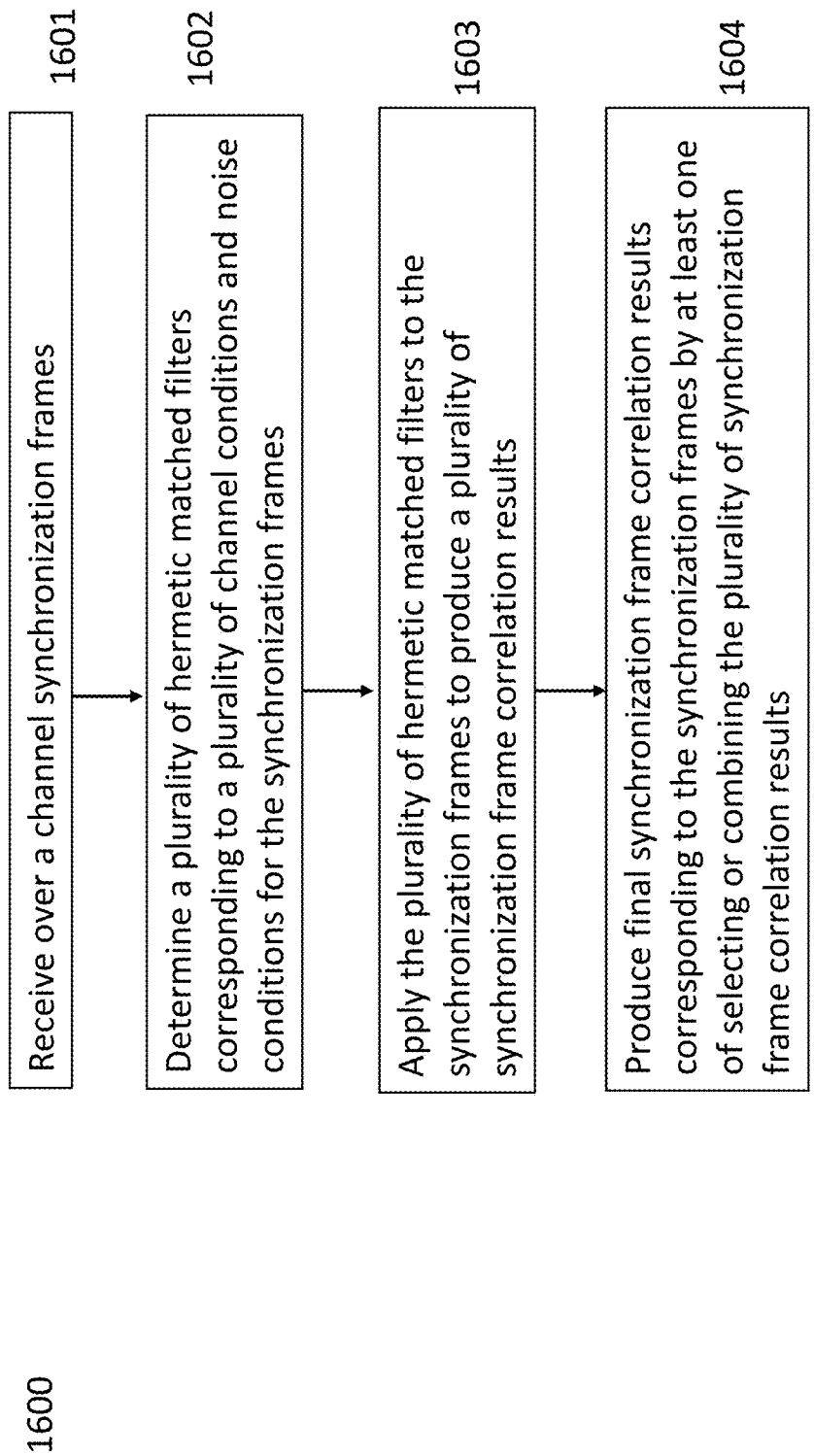
FIG. 16 shows a method of signal framing according to an exemplary embodiment.

FIG. 16 shows a method 1600 of signal framing according to an exemplary embodiment. In step 1601, channel synchronization frames are received over a channel. In step 1602, a plurality of hermetic matched filters corresponding to a plurality of channel conditions and noise conditions for the synchronization frames are determined. In step 1603, the plurality of hermetic matched filters are applied to the synchronization frames to produce a plurality of synchronization frame correlation results. In step 1604, final synchronization frame correlation results are produced corresponding to the synchronization frames by at least one of selecting or combining the plurality of synchronization frame correlation results. In some embodiments, the method further comprises determining a set of peaks corresponding to the plurality of synchronization frame correlation results; determining a set of synchronization frame locations for each of the synchronization frames corresponding to each of the peaks of the synchronization frame correlation results; applying a hermetic transform to each of the synchronization frame locations to produce demodulation results for each frame; and producing final synchronization frame correlation results by selecting synchronization frame locations that minimize a total square distance between the demodulation results and a constellation. The method steps are described further below and elsewhere in this description.

Figure 17:
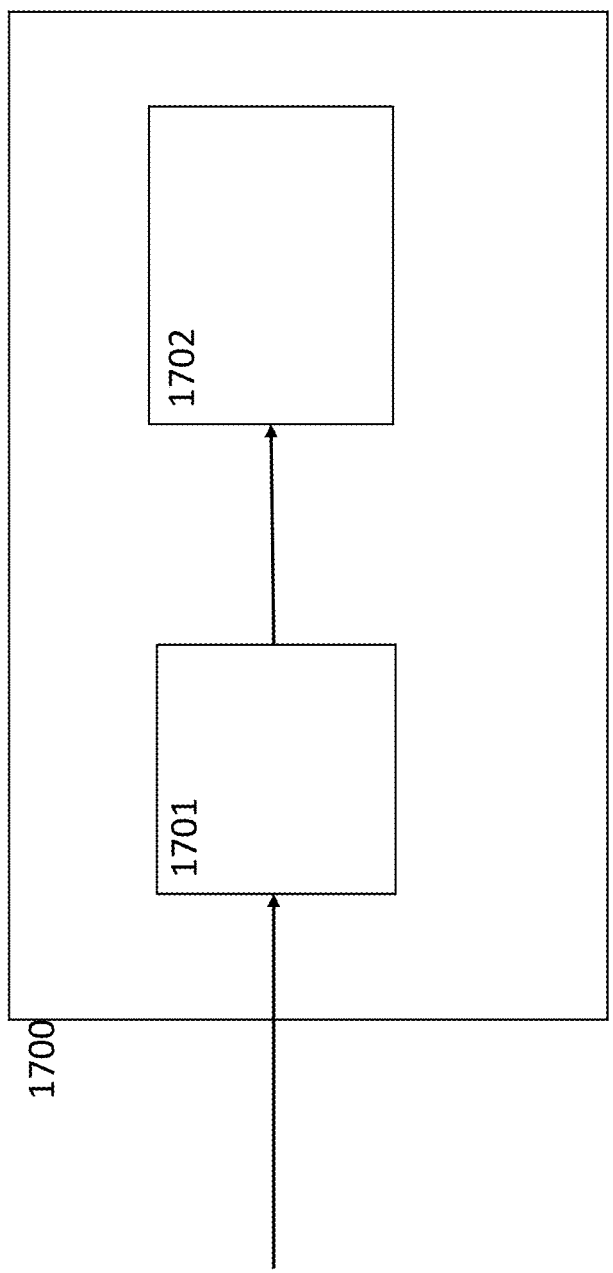
FIG. 17 shows a communication device for signal framing according to an exemplary embodiment.

FIG. 17 shows a communication device 1700 for signal framing according to an exemplary embodiment. The communication device 1700 comprises a receiver 1701 and a processor 1702. The receiver 1701 is configured to receiver over a channel synchronization frames. In some embodiments, the receiver 1701 may comprise appropriate hardware and/or software for signal reception and processing. In some embodiments, the receiver may comprise one or more antennas, demodulators, analog-to-digital converts, and other signal processing hardware and/or software. The receiver 1701 extracts the predetermined data and gaps comprising noise from the received signal frames. The processor 1702 is configured to determine a plurality of hermetic matched filters corresponding to a plurality of channel conditions and noise conditions for the synchronization frames; apply the plurality of hermetic matched filters to the synchronization frames to produce a plurality of synchronization frame correlation results; and produce final synchronization frame correlation results corresponding to the synchronization frames by at least one of selecting or combining the plurality of synchronization frame correlation results. In some embodiments, the processor is further configured to determine a set of peaks corresponding to the plurality of synchronization frame correlation results; determine a set of synchronization frame locations for each of the synchronization frames corresponding to each of the peaks of the synchronization frame correlation results; apply a hermetic transform to each of the synchronization frame locations to produce demodulation results for each frame; and produce final synchronization frame correlation results by selecting synchronization frame locations that minimize a total square distance between the demodulation results and a constellation. The processor 1702 may be implemented with hardware and/or software for processing the data, such as a microprocessor, baseband processor, and/or other signal processing hardware. The communications device 1700 may also comprise other suitable hardware and/or software, such as memory (e.g., a non-transitory storage medium) coupled to the processor, receiver, and/or transistor to store processing instructions, received data, data for transmission, and/or other data, buffers, filters, and other communications structures. In some embodiments, one or more components such as a receiver, transmitter, and processor may be combined. In some embodiments, one or more processing steps may be performed by a receiver and/or transmitter. The communication device is described further below and elsewhere in this description.

Figure 18:
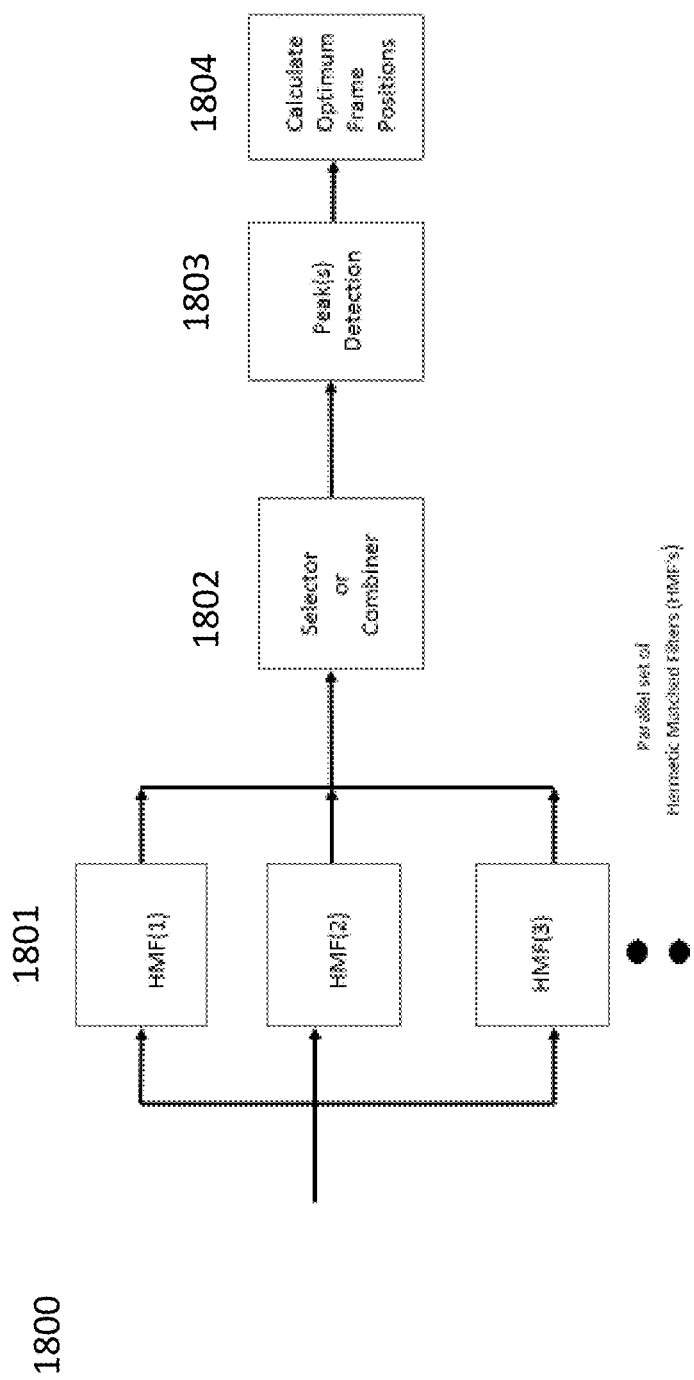
FIG. 18 shows block diagram for a signal framing device according to an exemplary embodiment.
Figure 19:
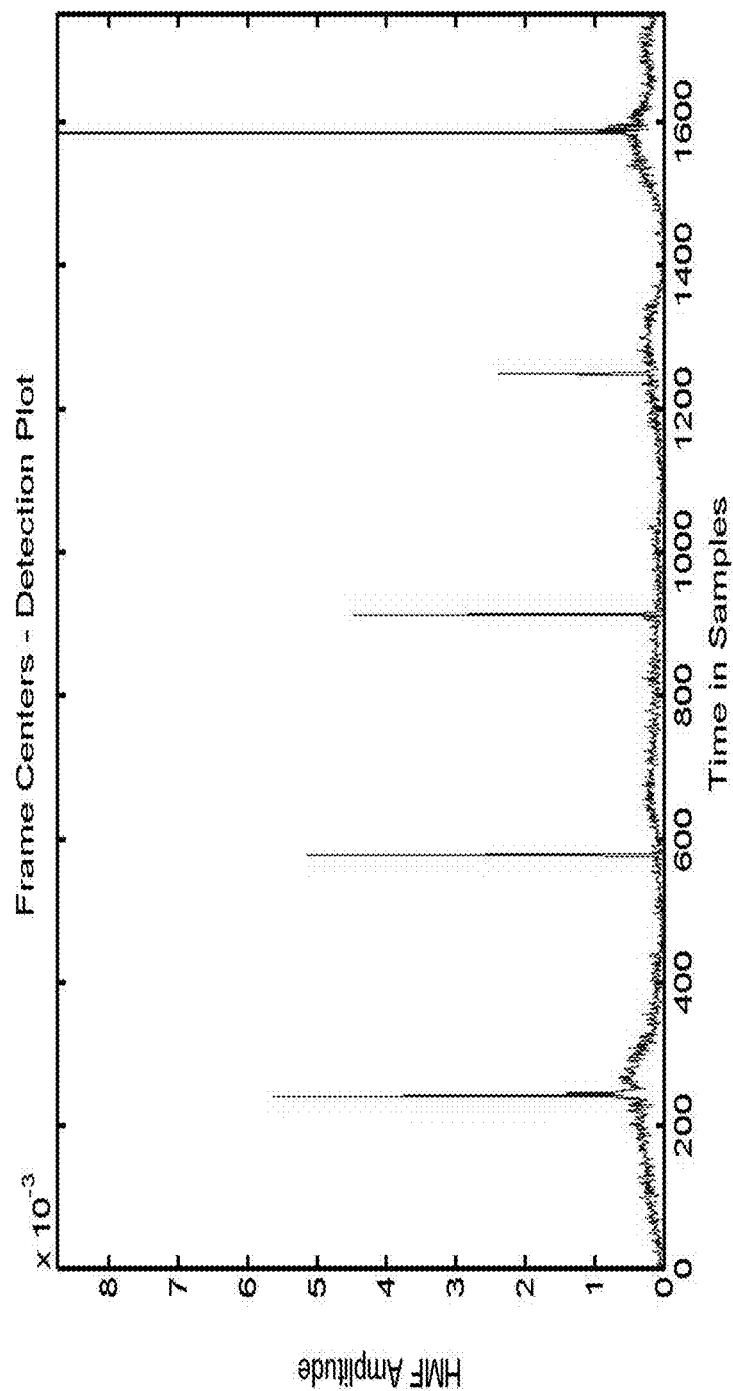
FIG. 19 shows an example of the HMF (absolute value) peaks-signal output according to an exemplary embodiment.

FIG. 18 shows block diagram for a signal framing device 1800 according to an exemplary embodiment. The signal framing device 1800 comprises a set of parallel hermetic matched filters (HMFs) 1801, a selector or combiner 1802, a peak detector 1803, and an optimum frame position calculator 1804. The parallel hermetic matched filters (HMFs) 1801 receive a signal and perform parallel hermetic matched filter operations on the signal. The selector or combiner 1802 receives the output of the parallel hermetic matched filters (HMFs) 1801 and performs section and/or combination operations on the output. Using the output from the selector or combiner 1802, the peak detector 1803 performs peak detection. The optimum frame position calculator 1804 then uses the results of the peak detection to determine optimum frame positions. FIG. 19 shows an example of the HMF (absolute value) peaks-signal output according to an exemplary embodiment.

Systems and Methods of increasing OFDM efficiency using a Spectral Compacting Transform and Hermetic Transforms In some embodiments, spectral efficiency improvements may be achieved by "compacting" a signal comprised of a set of modulated orthogonal basis signals, so that they occupy a smaller amount of spectrum than they originally did, then inverting the process so that the modulation(s) can be recovered using ordinary OFDM processing.

Figure 20:
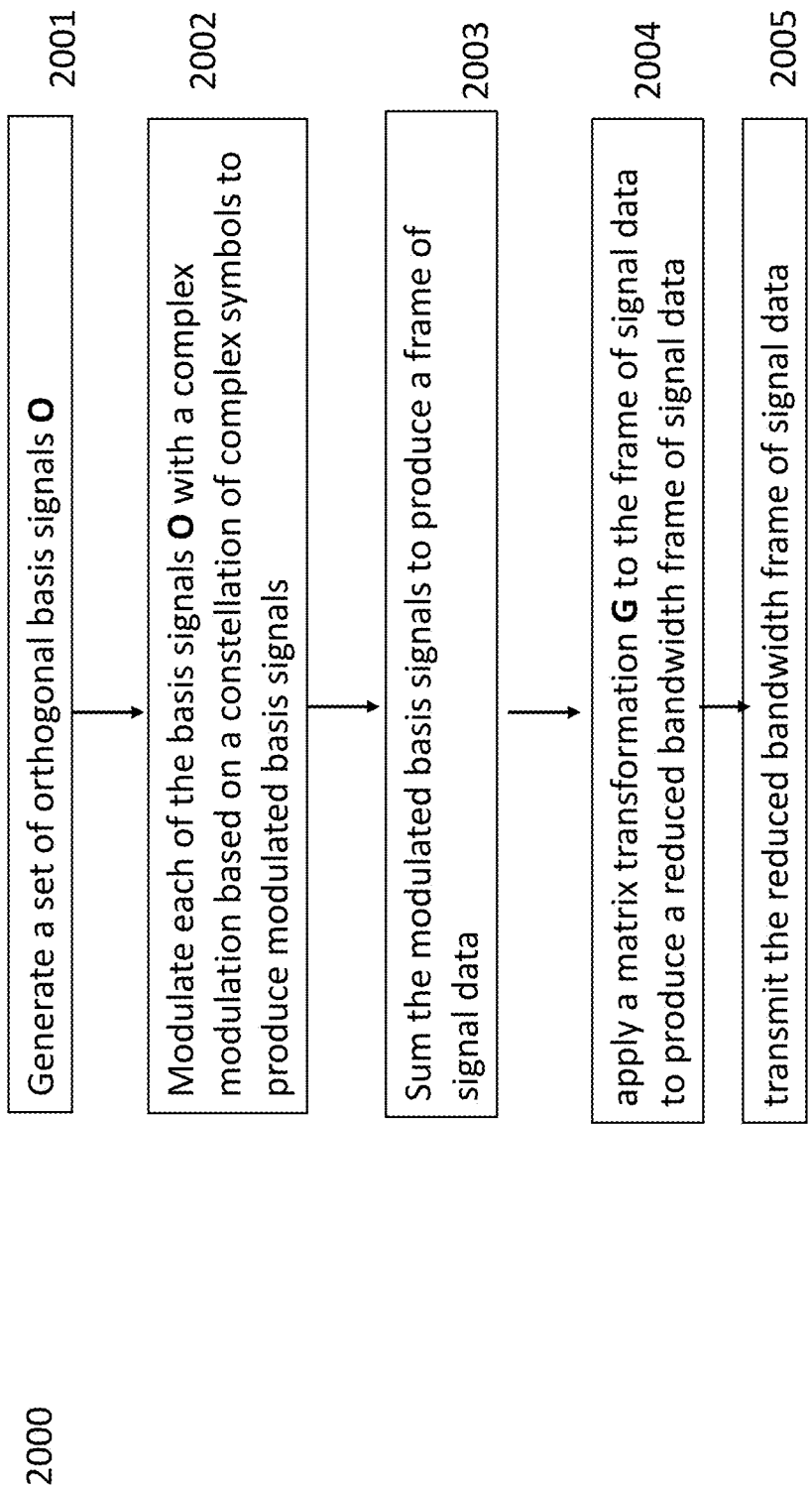
FIG. 20 shows a method of spectral compacting according to an exemplary embodiment.

FIG. 20 shows a method of spectral compacting 2000 according to an exemplary embodiment. In step 2001, a set of orthogonal basis signals O is generated. In step 2002, each of the basis signals O are modulated with a complex modulation based on a constellation of complex symbols to produce modulated basis signals. In step 2003, the modulated basis signals are summed to produce a frame of signal data. In step 2004, a matrix transformation G is applied to the frame of signal data to produce a reduced bandwidth frame of signal data. In step 2005, the reduced bandwidth frame of signal data is transmitted. The method steps are described further below and elsewhere in this description.

Figure 21:
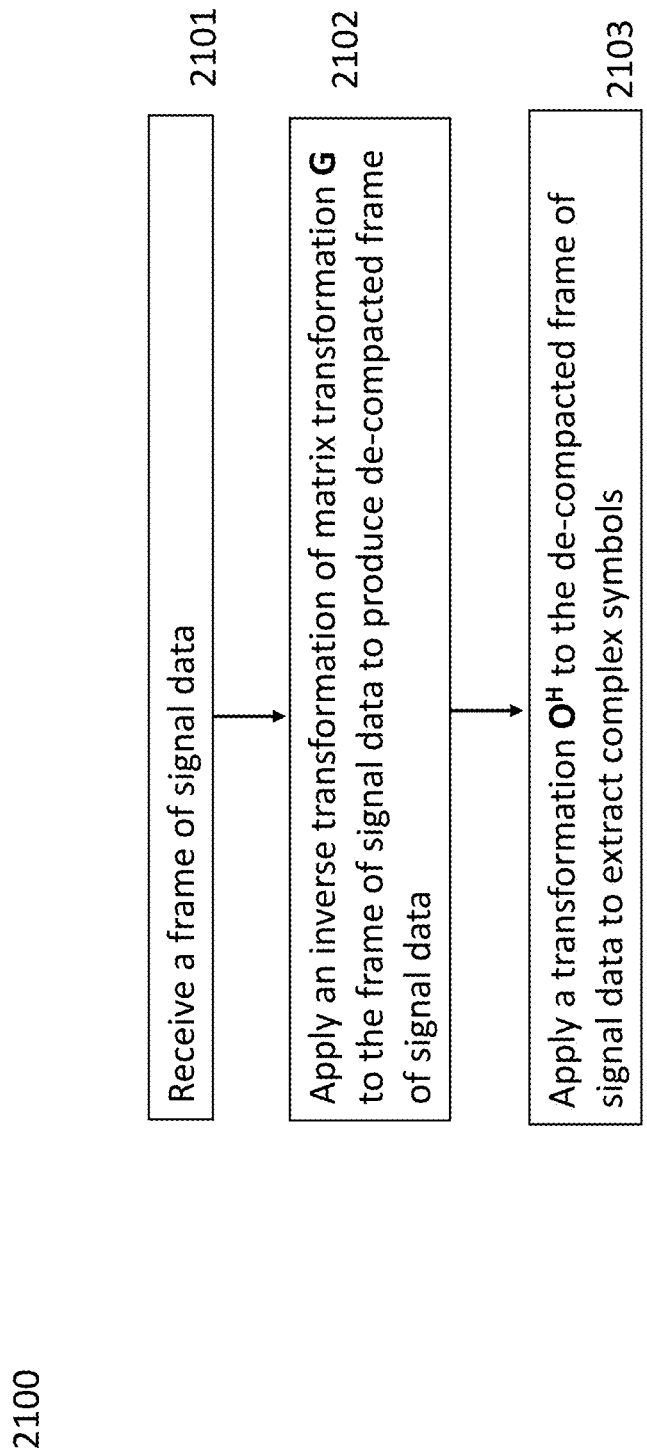
FIG. 21 shows method 2100 for spectral de-compacting according to an exemplary embodiment.

FIG. 21 shows method 2100 for spectral de-compacting according to an exemplary embodiment. At step 2101, a frame of signal data is received. At step 2102, an inverse transformation of matrix transformation G is applied to the frame of signal data to produce de-compacted frame of signal data. At step 2103, a transformation $O^H$ is applied to the de-compacted frame of signal data to extract complex symbols. The method steps are described further below and elsewhere in this description.

Figure 22A:
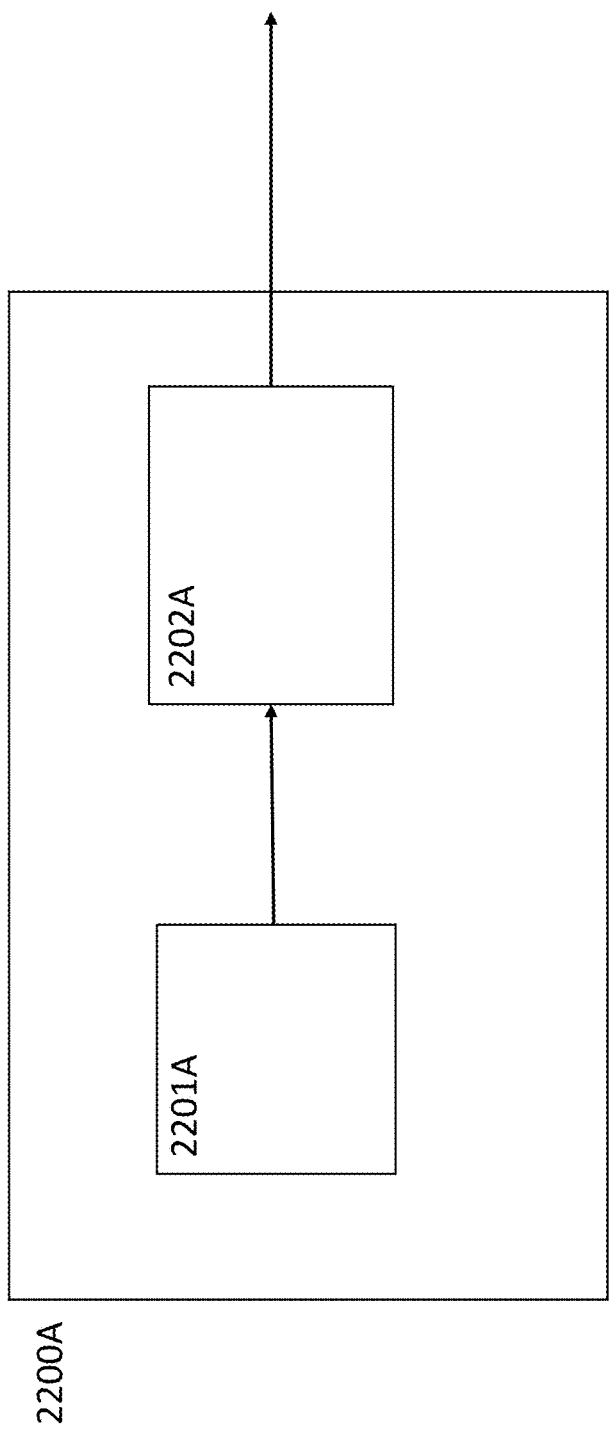
FIG. 22A shows a communication device for spectral compacting according to an exemplary embodiment.

FIG. 22A shows a communication device 2200A for spectral compacting according to an exemplary embodiment. The device 2200A comprises a processor 2201A and a transmitter 2202A. The processor 2201A is configured to generate a set of orthogonal basis signals O; modulate each of the basis signals O with a complex modulation based on a constellation of complex symbols to produce modulated basis signals; and sum the modulated basis signals to produce a frame of signal data; and apply a matrix transformation G to the frame of signal data to produce a reduced bandwidth frame of signal data. The transmitter 2202A is configured to transmit the reduced bandwidth frame of signal data. In some embodiments, the transmitter 2202A may comprise appropriate hardware and/or software for signal processing and transmission. In some embodiments, the receiver may comprise one or more antennas, modulators, digital-to-analog converts, and other signal processing hardware and/or software. The processor 2202B may be implemented with hardware and/or software for processing the data, such as a microprocessor, baseband processor, and/or other signal processing hardware. The communications device 2200B may also comprise other suitable hardware and/or software, such as memory (e.g., a non-transitory storage medium) coupled to the processor, receiver, and/or transistor to store processing instructions, received data, data for transmission, and/or other data, buffers, filters, and other communications structures. In some embodiments, one or more components such as a receiver, transmitter, and processor may be combined. In some embodiments, one or more processing steps may be performed by a receiver and/or transmitter. The communication device is described further below and elsewhere in this description.

Figure 22B:
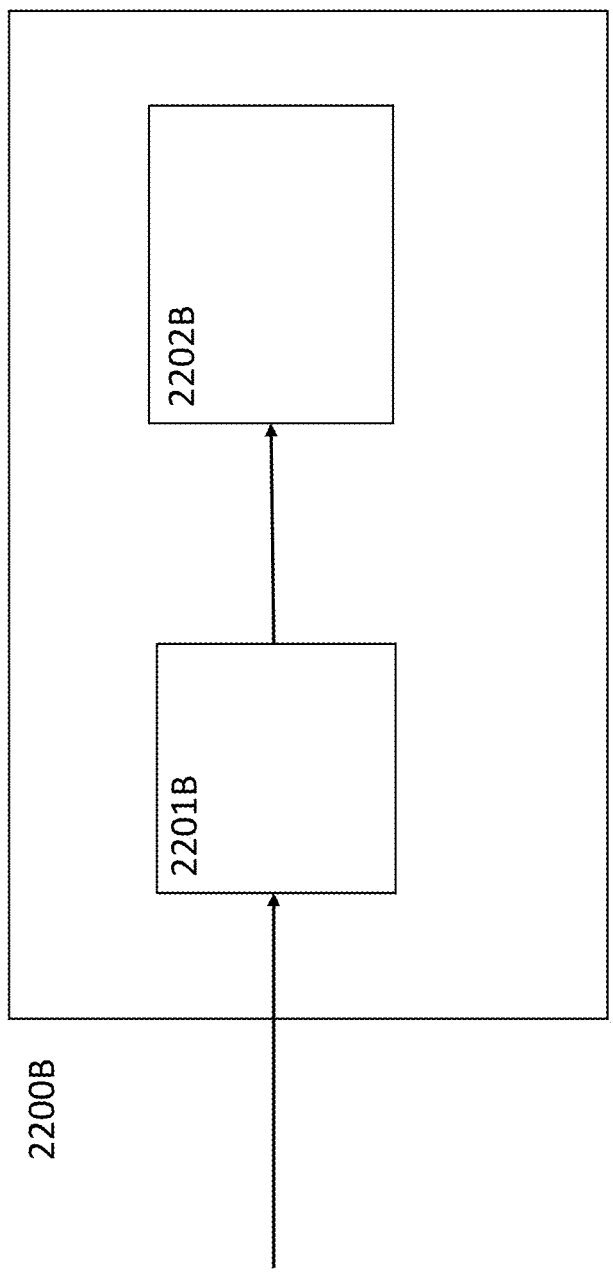
FIG. 22B shows a communication device for spectral de-compacting according to an exemplary embodiment.

FIG. 22B shows a communication device 2200B for spectral de-compacting according to an exemplary embodiment. The devices 2200B comprise a receiver 2201B and a processor 2202B. The receiver 2201B is configured to receiver a frame of signal data. In some embodiments, the receiver 2201B may comprise appropriate hardware and/or software for signal reception and processing. In some embodiments, the receiver may comprise one or more antennas, demodulators, analog-to-digital converts, and other signal processing hardware and/or software. The processor 2202B is configured to apply an inverse transformation of matrix transformation G to the frame of signal data to produce de-compacted frame of signal data; and apply a transformation $O^H$ to the de-compacted frame of signal data to extract complex symbols. The processor 2202B may be implemented with hardware and/or software for processing the data, such as a microprocessor, baseband processor, and/or other signal processing hardware. The communications device 2200B may also comprise other suitable hardware and/or software, such as memory (e.g., a non-transitory storage medium) coupled to the processor, receiver, and/or transistor to store processing instructions, received data, data for transmission, and/or other data, buffers, filters, and other communications structures. In some embodiments, one or more components such as a receiver, transmitter, and processor may be combined. In some embodiments, one or more processing steps may be performed by a receiver and/or transmitter. The communication device is described further below and elsewhere in this description.

In some embodiments, an important issue addressed in Hermetic OFDM is the modulation of channel signals and recovery of such modulation, from a basis set that are is not orthogonal in the conventional sense. An exemplary model of an OFDM signal basis can be described in terms of a signal matrix $\underline{\Sigma}$ comprising a set of sampled complex sinusoidal signals arranged as columns such that $$\underline{\Sigma}^H \underline{\Sigma} = \underline{I}\underline{\Sigma} = [\sigma_1 \sigma_2 \sigma_3 \ldots]$$

This condition occurs with the appropriate spacing of frequencies, essentially $\delta\omega \sim 1/T$, the frequency spacing is on the order of the reciprocal of the signal frame duration (T). The condition amounts to requiring the condition of channel (basis) signal orthogonality (and orthonormality) in a Euclidean space having a Hilbert Inner Product substituting for the usual Dot Product used with vectors having real components.

By comparison the condition imposed in making a Hermetic Transform is the following:

$$\Sigma\Sigma W_{\kappa\lambda} \sigma_\kappa \sigma_\lambda = \delta_{\kappa\lambda}$$

Here the Greek sigmas indicate summation ($\Sigma$) over the signal vector ($\sigma$) component indices ($\kappa, \lambda$) and $\delta$ is the Kronecker Delta function (=1 if the indices are Here the same, 0 otherwise). The W matrix acts like the complex) metric tensor, i.e. the signal space has now taken on a non-Euclidean character in order to achieve orthogonality. The signal basis vectors are not orthogonal in the original space, but are in this the "warped" space when the metric is W. As above, one solves for W to find a transformation where the latter condition applies.

One can also imagine performing the reverse operation, i.e. orthogonalizing the original signal matrix $\underline{\Sigma}$ of non-orthogonal vectors $\{\sigma_\kappa\}$ using the Singular Value Decomposition (SVD). The SVD algorithm solves for the decomposition of a matrix $\underline{X}$ (not necessarily square) in terms of left and right basis matrices ($\underline{U}$ and $\underline{V}$) and a diagonal matrix of singular values $\underline{S}$, as follows:

$$\underline{X} = \underline{U}\underline{S}\underline{V}^H$$

The singular values of $\underline{S}$ are arranged in descending order of absolute value.

The rank r (or alternatively, the effective rank) of $\underline{X}$ determines the number of orthogonal basis vectors that span the space of $\underline{X}$. These are determined by the number of significant singular values in $\underline{S}$. The first r column vectors of $\underline{U}$ are then the orthonormal basis generated by $\underline{X}$; we term this matrix $\underline{O}$. One can observe that the original basis set which comprises the signal matrix is non-orthogonal and occupies a particular amount of spectral bandwidth; the orthogonal basis generated from it occupies more spectral bandwidth. There exists a linear transformation T that maps from the matrix comprised of the original non-orthogonal basis, to the new matrix comprised of columns orthogonal (orthonormal) vectors. We write this transformation as follows:

$$\underline{T}\underline{\Sigma} = \underline{O}$$

Multiplying both sides from the right by the pseudo-inverse of $\underline{\Sigma}$ we obtain the following:

$$\underline{T} = \underline{O}(\underline{\Sigma}^{\#})$$

Note that $\underline{\Sigma}^{\#}$ is the Hermetic Transform $\underline{H}^0$.
The inverse transformation is the pseudo-inverse of $\underline{T}$, $$\underline{G} = \underline{T}^{\#} = \underline{\Sigma}\underline{O}^H$$

Note that $\underline{O}\,\underline{O}^H = \underline{I}$. The operator $\underline{G}$ transforms the matrix of orthonormal signals $\underline{O}$ into the matrix of non-orthonormal signals $\underline{\Sigma}$, which occupy less spectral bandwidth than the original basis.

Now consider modulating the original basis set O by a post-multiplying complex modulation vector c, then pre-multiplying by G. In a distortionless channel the signal we receive is $$\underline{Y} = \underline{G}\underline{X} = \underline{G}\underline{O}\underline{c} = \underline{\Sigma}\underline{c}$$

If one then sends this signal and the apply the inverse transformation on the other end, $$\underline{T}\underline{Y} = \underline{T}\underline{\Sigma}\underline{c} = \underline{O}\underline{c}$$

This signal is then demodulated by applying the pseudo-inverse of $\underline{O}$ ($=\underline{O}^H$)

$$\underline{O}^H \underline{O}\underline{c} = \underline{c}$$

Figure 23:
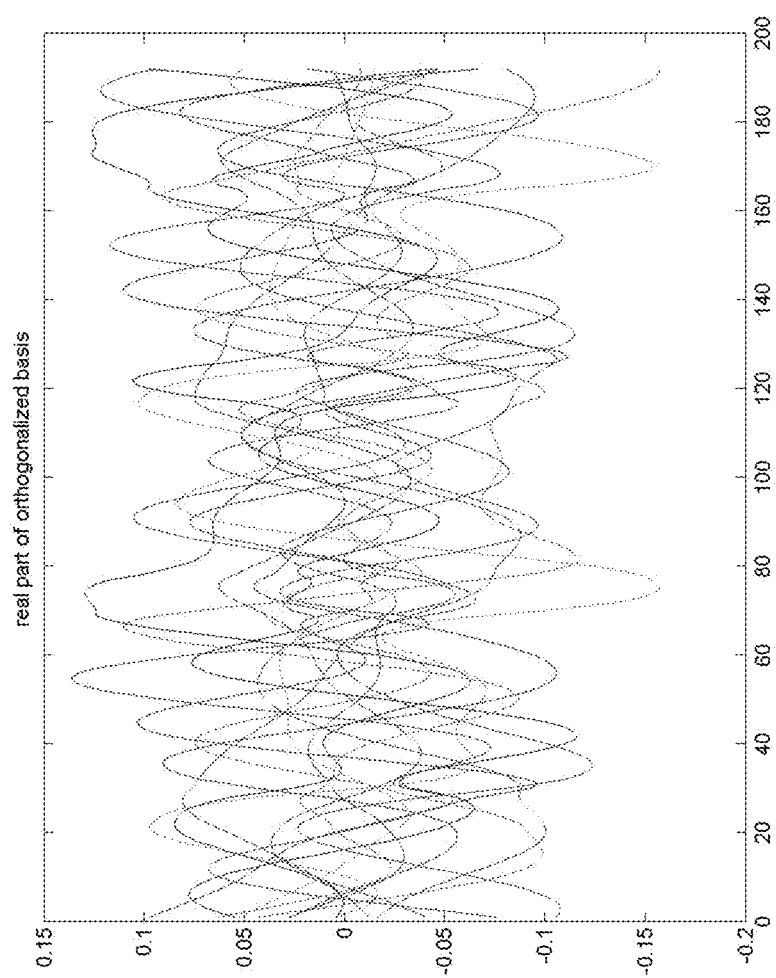
FIG. 23 shows the real part of a signal basis orthogonal in the strict Euclidean sense according to an exemplary embodiment.

FIG. 23 shows the real part of a signal basis orthogonal in the strict Euclidean sense according to an exemplary embodiment. The rank of the singular value matrix shows that there can be 14 orthogonal vectors in the space.

Figure 24:
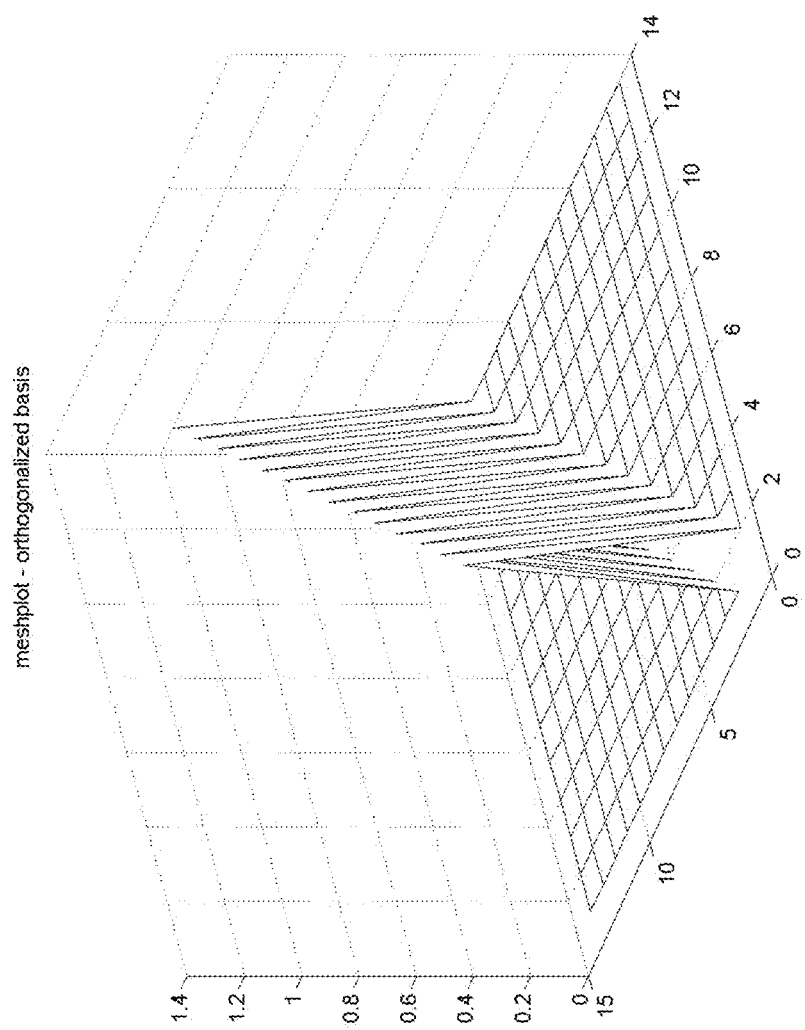
FIG. 24 shows a surface presenting the orthonormality of this basis according to an exemplary embodiment.

FIG. 24 shows a surface presenting the orthonormality of this basis according to an exemplary embodiment. The x and y axes correspond to the column index of particular signal vectors, the z value is the absolute value of the Hilbert Inner Product between the vectors correspond to the x and y index values. The Hilbert Inner Product of a column vector $\underline{v}$ with column vector $\underline{u}$ as the complex conjugate transpose (Hermitian conjugate) of $\underline{v}$ with the vector $\underline{u}$.

The Hilbert Inner Product (HIP) of each column vector with itself yields unity (1), the HIP of a given vector with any other vector in the set yields zero, as seen from FIG. 24. The clear diagonal ridge of the surface has a value of 1 and zero everywhere else.

Figure 25:
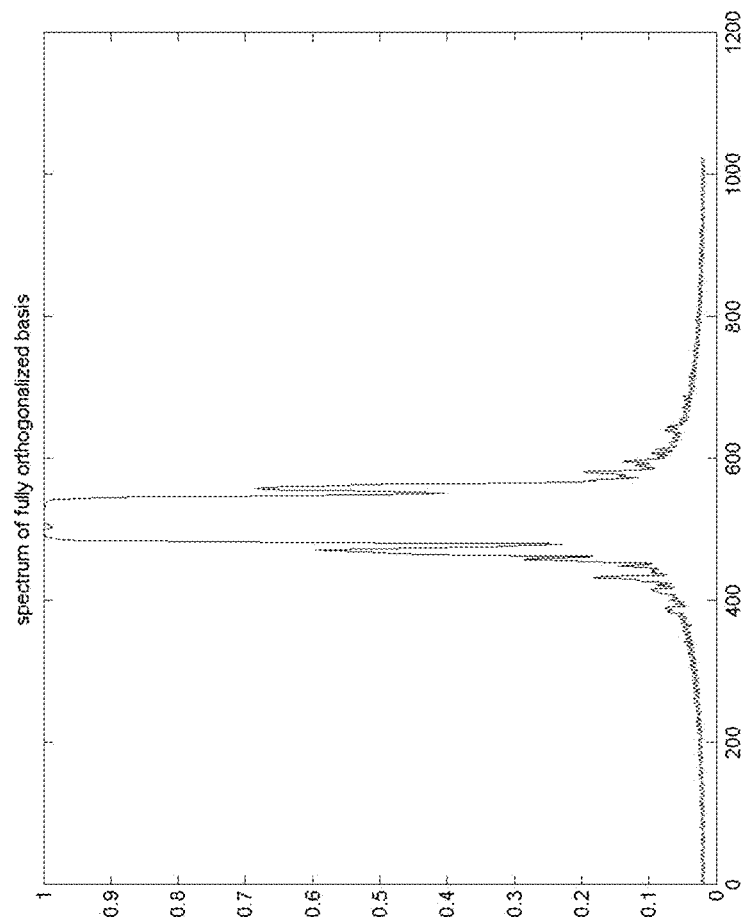
FIG. 25 shows the corresponding power spectrum of this orthogonal basis according to an exemplary embodiment.

FIG. 25 shows the corresponding power spectrum of this orthogonal basis according to an exemplary embodiment. The range of frequencies is normalized by the sampling frequency; the x-axis is spectral bin number, the y-axis is power spectral density.

Figure 26:
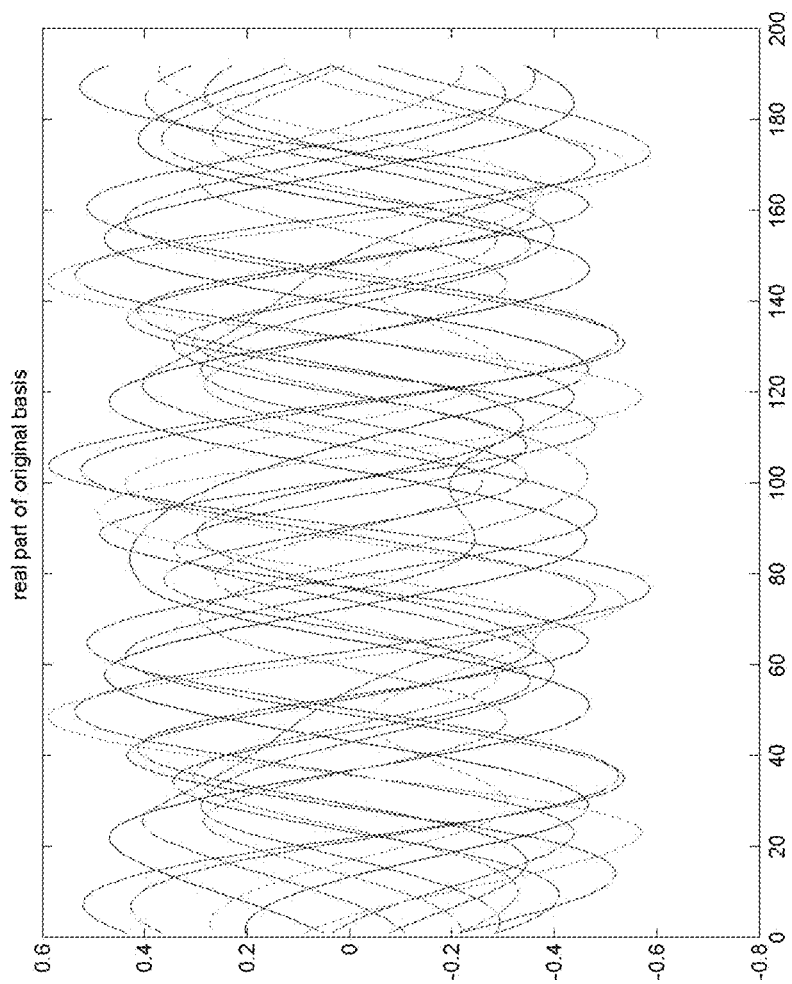
FIG. 26 shows the real part of the corresponding signal basis according to an exemplary embodiment.

Next one can apply a linear transformation $\underline{G}$ as described above. FIG. 26 shows the real part of the corresponding signal basis according to an exemplary embodiment. There are still 14 channel signals, now non-orthogonal in the strict Euclidean sense.

Figure 27:
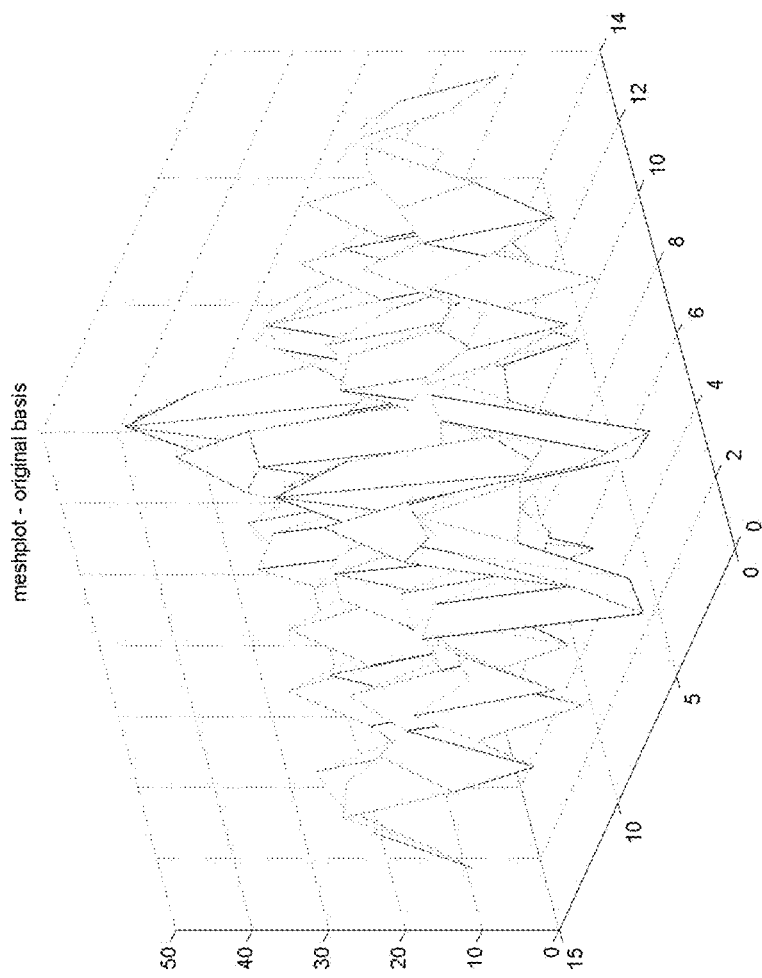
FIG. 27 shows the HIPS among this new basis functions are now seen to be non-orthogonal according to an exemplary embodiment.

FIG. 27 shows the HIPs among this new basis functions are now seen to be non-orthogonal according to an exemplary embodiment.

Figure 28:
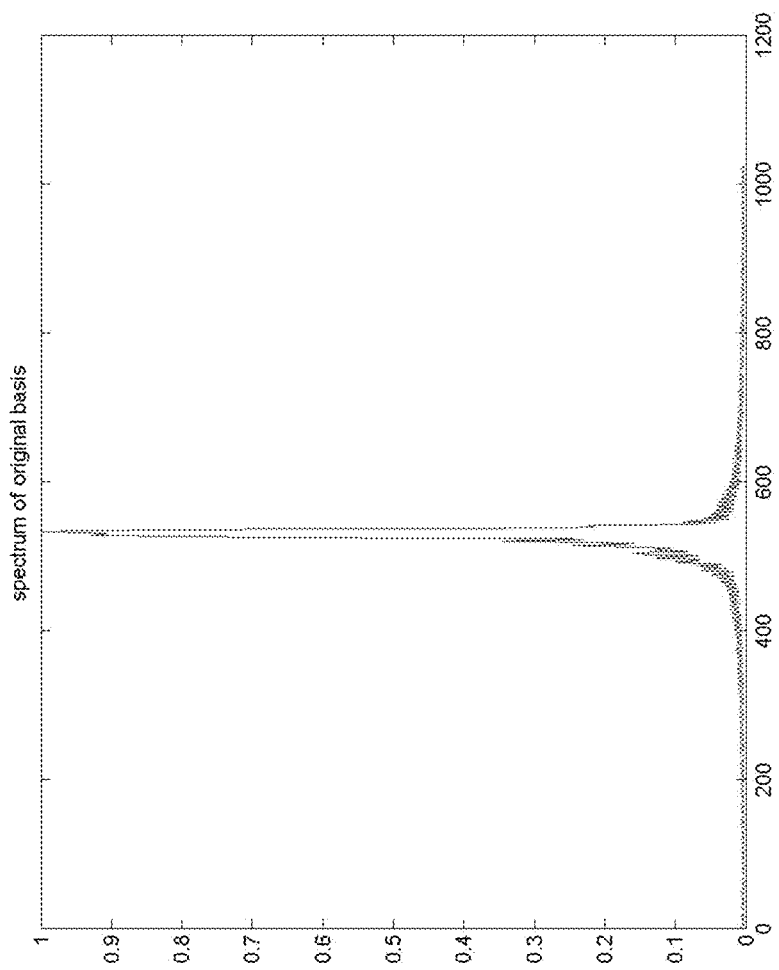
FIG. 28 shows a corresponding power spectrum of a basis according to an exemplary embodiment.

FIG. 28 shows a corresponding power spectrum of a basis according to an exemplary embodiment. It is seen that the spectral bandwidth occupied this basis is far less than that of the original basis.

Figure 29:
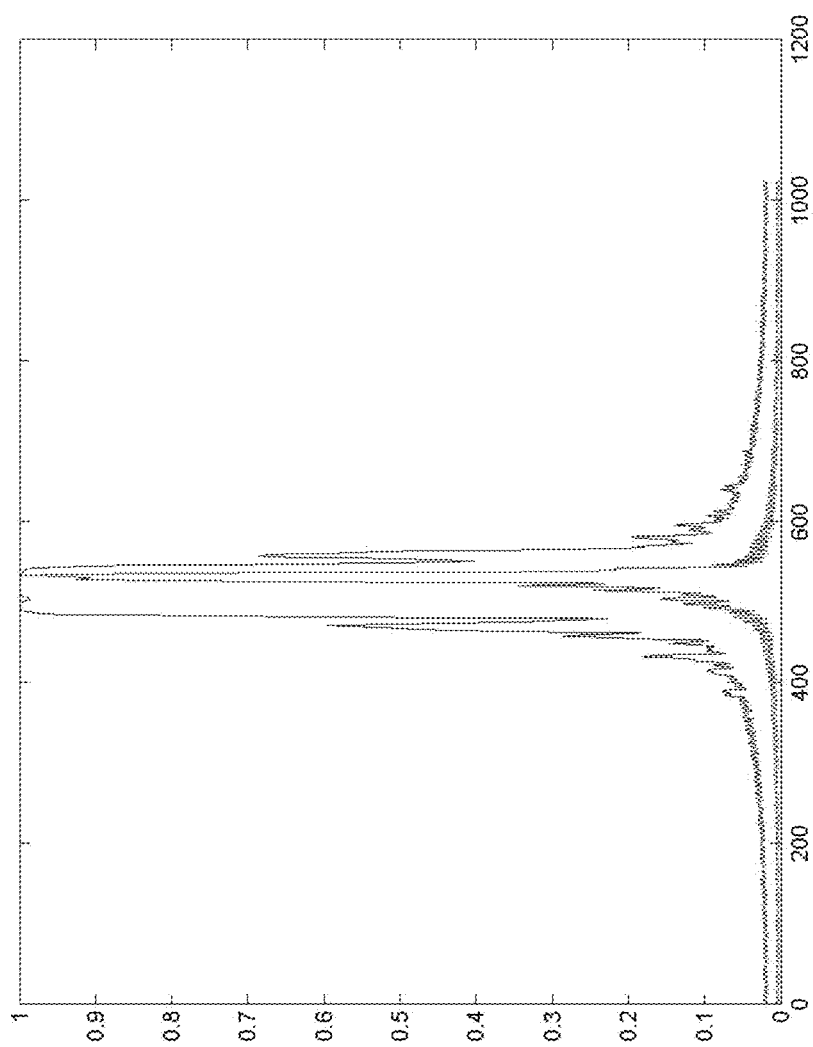
FIG. 29 shows two spectra overlaid (before and after transformation), so that the comparison of relative bandwidth can be obtained by inspection according to an exemplary embodiment.

FIG. 29 shows two spectra overlaid (before and after transformation), so that the comparison of relative bandwidth can be obtained by inspection according to an exemplary embodiment. A comparison of the spectral widths at the half-power points (y-axis value=0.5) gives a meaningful comparison.

Finally, a comparison is made between the original basis and the result of applying the inverse transformation. Since the bases are complex, the two basis sets are compared directly in complex space.

The results show that the original channel signals can be recovered essentially to within the limits of computational precision. As a result applied modulations are similarly recovered after applying the inverse spectral compacting transformation. This example merely illustrates one any number of linear transformations that might be arrived at by one with skill in the art, and knowledge of Hermetic Transforms, based on the disclosure herein in order to accomplish similar effects. Note that the matrix transformations discussed here are not required to have, and in general may not have the symmetry associated with ordinary filters that can be constructed to act via convolution/deconvolution operations. For example, the discrete convolution of a filter with impulse response h(k) with a signal x(n) is represented as $$y(n)=\Sigma h(n-k)x(k)$$

Figure 30:
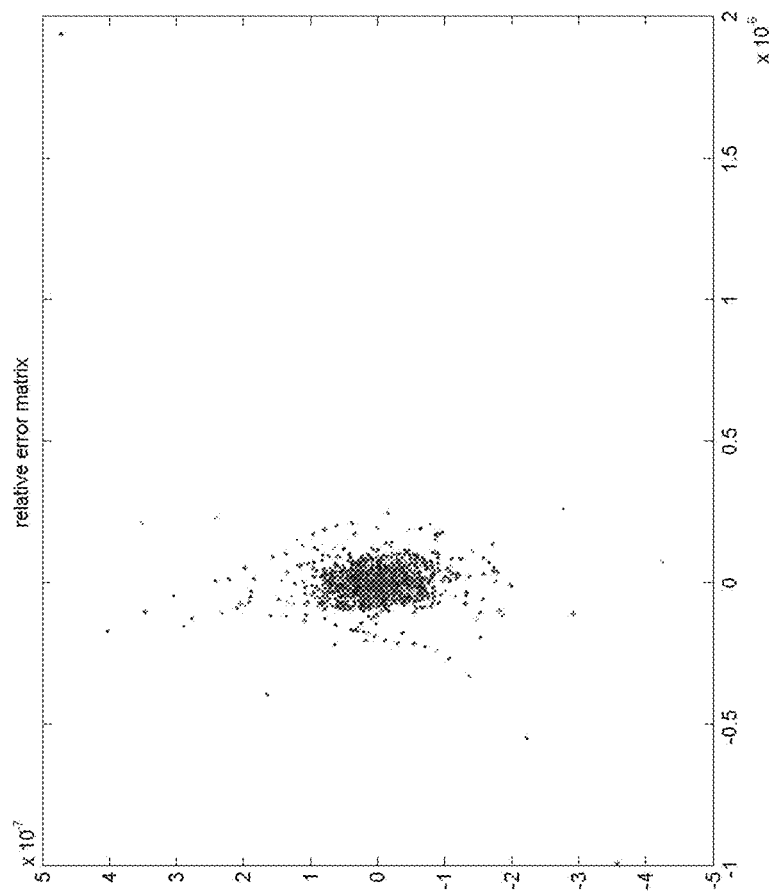
FIG. 30 shows a plot of the relative error matrix according to an exemplary embodiment.

FIG. 30 shows a plot of the relative error matrix according to an exemplary embodiment. The data (x) and the filter response (h) are interchangeable. The term h(n-k) can be taken to be a matrix which has evident and particular symmetry, in contrast to a general matrix multiply of the type $\Sigma M(n,k) x(k)$ where M can be anything.

Figure 31:
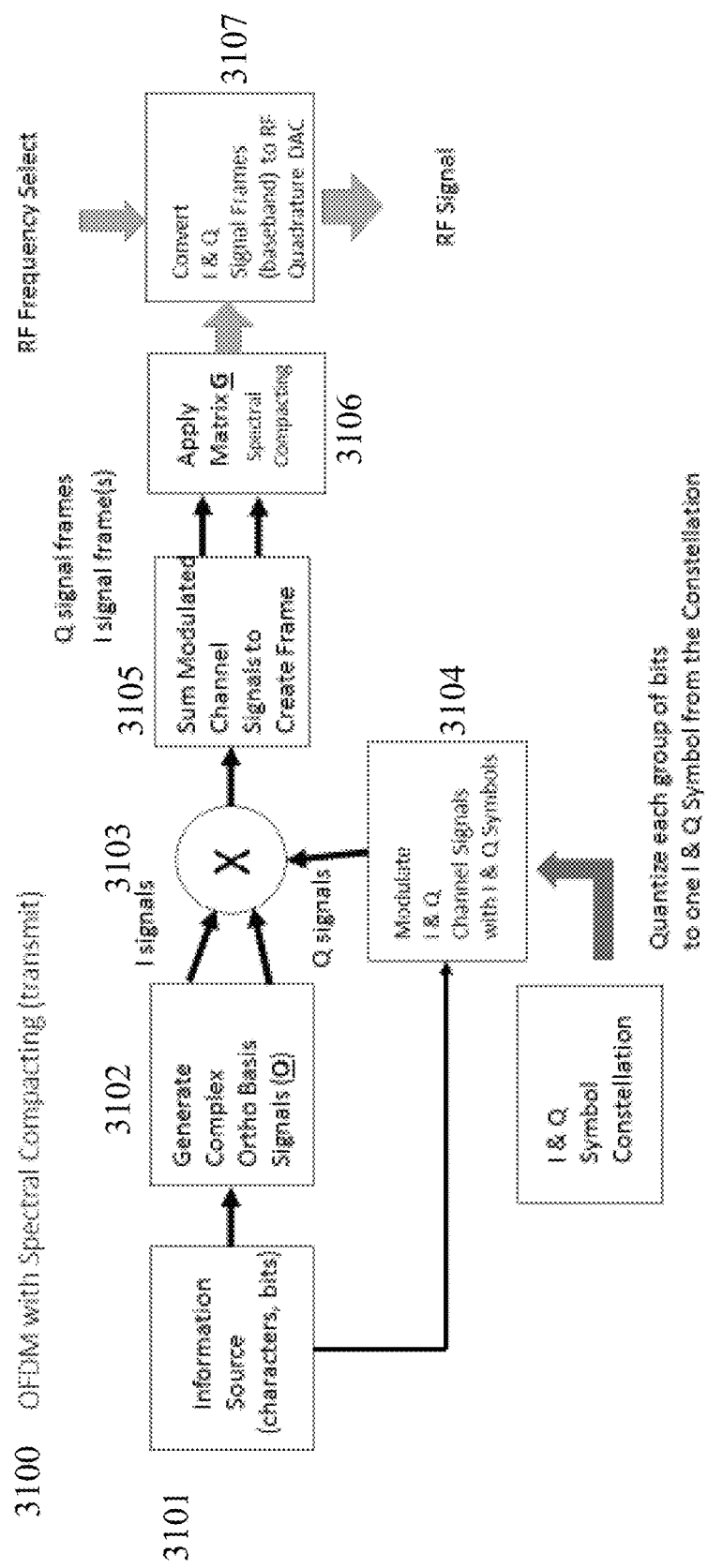
FIG. 31 shows an OFDM system using Spectral Compacting according to an exemplary embodiment.

FIG. 31 shows an OFDM system 3100 using Spectral Compacting according to an exemplary embodiment. In particular, FIG. 31 shows the steps involved in sending of information in an exemplary embodiment. An information source 3101 provides information in binary form (bits), which are then mapped to constellation symbols (complex numbers) that are utilized to modulate a set of orthogonal channel signals (signal basis), as a matrix having complex values (O) generated by generator 3102. Each group of bits in an I & Q symbol constellation is quantized to one I & Q Symbol form the Constellation using quantizer 3104 by modulating I & Q Channel Signals with I & Q symbols. The modulated channel signals are summed by summer 3105 to produce a single frame of the signal waveform. The overall operation is equivalent to multiplying the matrix O by a complex modulation vector, c. In exemplary embodiments, each frame of signal data is treated as a column vector that is multiplied by a transformation matrix G by a spectral compactor 3106 that performs the spectral compacting operation as outline above. The frames are concatenated to produce a complex waveform. The real and imaginary components of this complex waveform (or equivalently I and Q components)) are fed to a Quadrature Digital to Analog Converter (DAC) 3107 which directly forms a real waveform that has been upconverted to an information-bearing RF frequency signal for subsequent amplification and transmission through an antenna.

Figure 32:
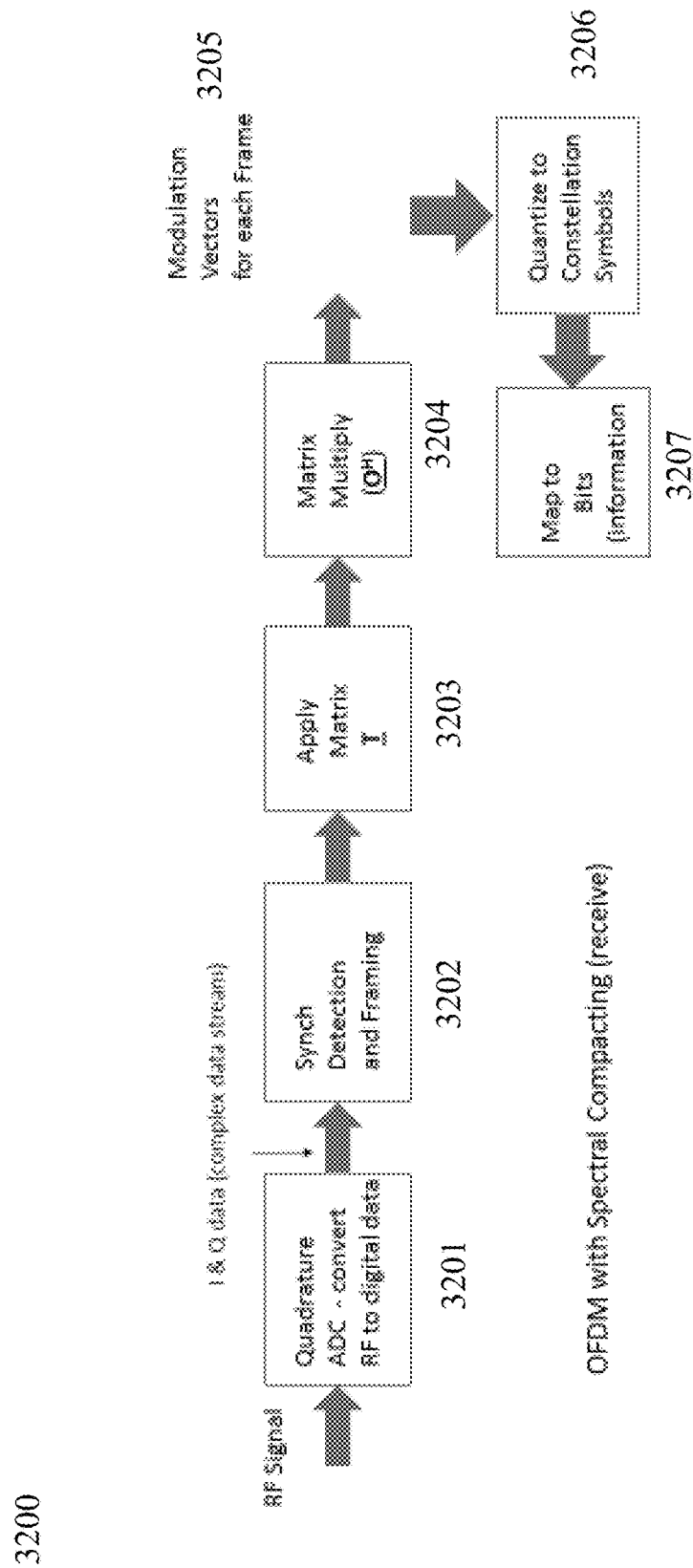
FIG. 32 shows an OFDM system 3200 using Spectral De-Compacting according to an exemplary embodiment.

FIG. 32 shows an OFDM system 3200 using Spectral De-Compacting according to an exemplary embodiment. In particular, FIG. 32 shows the steps involved in reception of the signal and recovery of the transmitted information in an exemplary embodiment. A quadrature analog to digital converter (ADC) 3201 converts the incoming signal into a complex stream of digital data that is framed through detection of synchronization frame signals by a framer 3202, or through the parallel HMF approach specified above. Each frame of data is transformed with a matrix T by processing block 3203, as described previously, in order to perform the inverse of the spectral compacting operation. The complex modulation vector for a given frame is then recovered by applying the Hermitian Conjugate of the Channel Basis Matrix ($O^H$) at processing block 3204. The complex components of the recovered complex modulation vector 3205 are subsequently quantized to symbols from the QAM constellation using a quantizer 3206. These symbols are each then mapped to particular bit patterns suing bit mapper 3207 so that the original information is recovered. In some embodiments, this process may comprise further steps such as encoding of bits to accomplish acceptable bit-error-rate. The encoding portion of the system can also make use of methods such as Forward Error Correction, Turbo-Codes, Low-Density Parity Check Codes, etc.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosure.

The invention claimed is:

1. A method of making a Hermetic transform to mitigate noise, the method comprising:
   receiving over a channel signal frames comprising predetermined data and gaps comprising noise;
   framing the predetermined data;
   constructing a set of linear equations which relate a transfer function matrix of the channel to the predetermined data;
   determining the transfer function matrix by inverting the linear equations using a first pseudo inverse matrix;
   incorporating transfer function matrix into linear equations for a hermetic transform; and
   determining the hermetic transform using a second pseudo inverse matrix based on the predetermined data and the noise.

2. A apparatus for making a Hermetic transform to mitigate noise, the apparatus comprising:
   a receiver for receiving over a channel signal frames comprising predetermined data and gaps comprising noise; and
   a processor configured to:
      frame the predetermined data;
      construct a set of linear equations which relate a transfer function matrix of the channel to the received data;
      determine the transfer function matrix by inverting the linear equations using a first pseudo inverse matrix;
      incorporate transfer function matrix into linear equations for a hermetic transform; and
      determine the hermetic transform using a second pseudo inverse matrix.

3. A method of distributing signal modulation, the method comprising:
   applying a pre-distortion matrix to a complex modulation vector to produce a pre-distorted modulation vector;
   applying an orthogonal matrix to the pre-distorted modulation vector to distribute the pre-distorted modulation vector over a set of channel signal basis functions of a channel signal matrix to produce a distributed modulation vector;
   applying the channel signal matrix to the distributed modulation vector to produce a signal frame; and
   transmitting the signal frame.

4. An apparatus for distributing signal modulation, the apparatus comprising:
   a processor configured to:
      apply a pre-distortion matrix to complex a modulation vector to produce a pre-distorted modulation vector;
      apply an orthogonal matrix to the pre-distorted modulation vector to distribute the pre-distorted modulation vector over a set of channel signal basis functions of a channel signal matrix to produce a distributed modulation vector;
      apply the channel signal matrix to the distributed modulation vector to produce a signal frame; and
   a transmitter for transmitting the signal frame.

5. A method receiving distributed signal modulation, the method comprising
  receiving over a channel data comprising signal frames;
  determining a signal domain hermetic transform using a pseudo inverse matrix;
  applying the signal domain hermetic transform to the signal frames to produce an intermediate vector result; and
  applying a code domain transform to the intermediate vector result to remove modulation distribution and recover an original transmitted modulation vector.

6. A apparatus for receiving distributed signal modulation, the apparatus comprising
  a receiver for receiving over a channel data comprising signal frames;
  a processor configured to:
    determine a signal domain hermetic transform using a pseudo inverse matrix;
    apply the signal domain hermetic transform to the signal frames to produce an intermediate vector result; and
    apply a code domain transform to the intermediate vector result to remove modulation distribution and recover an original transmitted modulation vector.

7. A method of parallel discrete hermetic transform demodulation, the method comprising:
  receiving over a channel data comprising signal frames;
  determining a plurality of hermetic transforms corresponding to a plurality of channel conditions and noise conditions;
  applying the plurality of hermetic transforms to the signal frames to produce a plurality of intermediate modulation vector results; and
  producing final modulation vector results corresponding to the signal frames by at least one of selecting or combining the intermediate modulation vector results.

8. The method of claim 7, further comprising:
  determining a set of weights to be applied to the intermediate modulation vector results, wherein the weights are selected to minimize a total square distance between the final modulation vector results and a constellation;
  applying the weights to each of the intermediate modulation vector results to produce weighted intermediate modulation vector results; and
  summing the weighted intermediate modulation vector results to produce the final modulation vector results.

9. The method of claim 7, further comprising:
  selecting the intermediate modulation vector results which minimize a total square distance between the final modulation vector results and a constellation.

10. A apparatus for parallel discrete hermetic transform demodulation, the apparatus comprising:
  a receiver for receiving over a channel data comprising signal frames;
  a processor configured to:
    determine a plurality of hermetic transforms corresponding to a plurality of channel conditions and noise conditions;
    determine a plurality of hermetic transforms corresponding to a plurality of channel conditions and noise conditions; and
    produce final modulation vector results corresponding to the signal frames by at least one of selecting or combining the intermediate modulation vector results.

11. The apparatus of claim 10, wherein the processor is further configured to:
  determine a set of weights to be applied to the intermediate modulation vector results, wherein the weights are selected to minimize a total square distance between the final modulation vector results and a constellation;
  apply the weights to each of the intermediate modulation vector results to produce weighted intermediate modulation vector results; and
  sum the weighted intermediate modulation vector results to produce the final modulation vector results.

12. The apparatus of claim 10, wherein the processor is further configured to:
  select the intermediate modulation vector results which minimize a total square distance between the final modulation vector results and a constellation.

13. A method for signal framing, the method comprising
  receiving over a channel synchronization frames;
  determining a plurality of hermetic matched filters corresponding to a plurality of channel conditions and noise conditions for the synchronization frames;
  applying the plurality of hermetic matched filters to the synchronization frames to produce a plurality of synchronization frame correlation results; and
  producing final synchronization frame correlation results corresponding to the synchronization frames by at least one of selecting or combining the plurality of synchronization frame correlation results.

14. The method of claim 13, further comprising:
  determining a set of peaks corresponding to the plurality of synchronization frame correlation results;
  determining a set of synchronization frame locations for each of the synchronization frames corresponding to each of the peaks of the synchronization frame correlation results;
  applying a hermetic transform to each of the synchronization frame locations to produce demodulation results for each frame; and
  producing final synchronization frame correlation results by selecting synchronization frame locations that minimize a total square distance between the demodulation results and a constellation.

15. A apparatus for signal framing, the apparatus comprising:
  a receiver for receiving over a channel synchronization frames; and
  a processor configured to:
    determine a plurality of hermetic matched filters corresponding to a plurality of channel conditions and noise conditions for the synchronization frames;
    apply the plurality of hermetic matched filters to the synchronization frames to produce a plurality of synchronization frame correlation results; and
    produce final synchronization frame correlation results corresponding to the synchronization frames by at least one of selecting or combining the plurality of synchronization frame correlation results.

16. The apparatus of claim 15, wherein the processor is further configured to:
  determine a set of peaks corresponding to the plurality of synchronization frame correlation results;
  determine a set of synchronization frame locations for each of the synchronization frames corresponding to each of the peaks of the synchronization frame correlation results;

apply a hermetic transform to each of the synchronization frame locations to produce demodulation results for each frame; and produce final synchronization frame correlation results by selecting synchronization frame locations that minimize a total square distance between the demodulation results and a constellation.

\* \* \* \* \*